(12) United States Patent
Nakayama et al.

(10) Patent No.: US 9,972,033 B2
(45) Date of Patent: May 15, 2018

(54) DISTRIBUTION APPARATUS, TERMINAL APPARATUS AND DISTRIBUTION METHOD

(71) Applicant: YAHOO JAPAN CORPORATION, Tokyo (JP)

(72) Inventors: Kazuki Nakayama, Tokyo (JP); Narae Lee, Tokyo (JP); Tatsuaki Suzuki, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 602 days.

(21) Appl. No.: 14/323,569

(22) Filed: Jul. 3, 2014

(65) Prior Publication Data

US 2015/0066666 A1    Mar. 5, 2015

(30) Foreign Application Priority Data

Aug. 30, 2013 (JP) ................................ 2013-180676

(51) Int. Cl.
| | | |
|---|---|---|
| *G06Q 30/00* | (2012.01) | |
| *G06Q 30/02* | (2012.01) | |
| *G06F 3/0481* | (2013.01) | |
| *G06T 11/60* | (2006.01) | |

(Continued)

(52) U.S. Cl.
CPC ....... *G06Q 30/0277* (2013.01); *G06F 3/0481* (2013.01); *G06Q 30/02* (2013.01); *G06Q 30/0269* (2013.01); *G06T 11/60* (2013.01); *G09G 5/14* (2013.01); *H04M 1/72519* (2013.01)

(58) Field of Classification Search
None
See application file for complete search history.

(56) References Cited

U.S. PATENT DOCUMENTS

| | | | |
|---|---|---|---|
| 7,956,869 B1 * | 6/2011 | Gilra ..................... | G06F 3/0481 345/157 |
| 2010/0245651 A1 * | 9/2010 | Minamino ................ | G06T 3/40 348/333.05 |

(Continued)

FOREIGN PATENT DOCUMENTS

| | | |
|---|---|---|
| JP | A-06-266330 | 9/1994 |
| JP | A-10-222336 | 8/1998 |

(Continued)

OTHER PUBLICATIONS

Sep. 8, 2015 Office Action issued in Japanese Patent Application No. 2014-141721.

(Continued)

*Primary Examiner* — Luis A Brown
*Assistant Examiner* — Radu Andrei
(74) *Attorney, Agent, or Firm* — Oliff PLC

(57) ABSTRACT

A distribution apparatus includes a receiving unit and a distributing unit. The receiving unit receives an acquisition request for a first content. The distributing unit distributes the first content displayed with a second content and control information that causes a region of the second content that does not overlap the first content to be displayed in a selectable state and causes a region of the second content overlapping the first content to be displayed so as to overlap the first content in a non-selectable state, when the acquisition request is received by the receiving unit.

19 Claims, 16 Drawing Sheets

(51) Int. Cl.
*G09G 5/14* (2006.01)
*H04M 1/725* (2006.01)

(56) References Cited

U.S. PATENT DOCUMENTS

| | | | | |
|---|---|---|---|---|
| 2012/0268454 | A1* | 10/2012 | Yokoi | G09G 3/003 345/419 |
| 2015/0062052 | A1* | 3/2015 | Bernstein | G06F 3/0416 345/173 |
| 2015/0363084 | A1* | 12/2015 | Spjuth | G06L 11/60 715/716 |

FOREIGN PATENT DOCUMENTS

| | | |
|---|---|---|
| JP | A-10-333867 | 12/1998 |
| JP | A-2001-195412 | 7/2001 |
| JP | A-2001-282157 | 10/2001 |
| JP | A-2001-317955 | 11/2001 |
| JP | 2002-215446 A | 8/2002 |
| JP | A-2003-022042 | 1/2003 |
| JP | A-2003-077006 | 3/2003 |
| JP | A-2003-271279 | 9/2003 |
| JP | A-2004-021522 | 1/2004 |
| JP | A-2004-152074 | 5/2004 |
| JP | 2004-178038 A | 6/2004 |
| JP | A-2004-163592 | 6/2004 |
| JP | A-2005-310059 | 11/2005 |
| JP | A-2006-098888 | 4/2006 |
| JP | A-2006-101554 | 4/2006 |
| JP | A-2010-165354 | 7/2010 |
| JP | A-2010-526494 | 7/2010 |
| JP | 2010-536056 A | 11/2010 |
| JP | A-2012-137805 | 7/2012 |
| WO | WO 02/01370 A1 | 1/2002 |
| WO | WO 2008/137482 A1 | 11/2008 |

OTHER PUBLICATIONS

Feb. 25, 2002 Japanese Office Action issued in Japanese Application No. 2013-180676 (with translation).

Jun. 10, 2014 Japanese Office Action issued in Japanese Application No. 2013-180676 (with translation).

Jun. 10, 2014 Japanese Decision of a Patent Grant issued in Japanese Application No. 2013-180676 (with translation).

Aug. 15, 2017 Office Action issued in Japanese Patent Application No. 2016-087279.

* cited by examiner

| ADVERTISER ID | ADVERTISING CONTENT | BIDDING PRICE | CTR |
|---|---|---|---|
| B10 | A10 | 100 | 0.02 |
| | A20 | 50 | 0.01 |
| | A30 | 150 | 0.02 |
| | ... | ... | ... |
| B20 | A40 | 100 | 0.01 |
| | A50 | 50 | 0.02 |
| | ... | ... | ... |
| ... | ... | ... | ... |

DISTRIBUTION APPARATUS, TERMINAL APPARATUS AND DISTRIBUTION METHOD

CROSS-REFERENCE TO RELATED APPLICATION(S)

The present application claims priority to and incorporates by reference the entire contents of Japanese Patent Application No. 2013-180676 filed in Japan on Aug. 30, 2013.

BACKGROUND OF THE INVENTION

1. Field of the Invention

The present invention relates to a distribution apparatus, a terminal apparatus and a distribution method.

2. Description of the Related Art

In recent years, advertisement distribution through the Internet is widespread. For example, advertising content on enterprises and items is displayed at predetermined positions of a webpage. Such advertising content is an icon such as a still image, a moving image, or text data, and a hyperlink (hereinafter referred to simply as a "link") to a webpage (hereinafter referred to as an advertisement page) provided by an advertiser is embedded. When users click on the advertising content, the advertisement page is displayed.

As a technique related to advertisement display, a technique of displaying information content on a first layer and displaying advertising content in a second layer behind the information content is proposed. Moreover, a technique of disabling a link function of web content when displaying an advertisement image so as to be superimposed on the web content is proposed.

However, the conventional technique cannot be said to be able to display advertisements so as to be beneficial to both a webpage distributor and an advertiser. Specifically, in the conventional technique, it is difficult to enable both the link embedded in the webpage and the link embedded in the advertising content. For example, in the conventional technique of displaying advertising content in the second layer, since the user cannot click on the advertising content, the user cannot view the advertisement page. This is not beneficial to the advertiser that provides the advertising content. Moreover, in the conventional technique of disabling the link function of the web content, the user cannot operate the web content during displaying of an advertisement. This is not beneficial to the webpage distributor that provides the web content. Due to this, in the conventional technique, it is difficult to display advertisements beneficial to both the webpage distributor and the advertiser.

SUMMARY OF THE INVENTION

It is an object of the present invention to at least partially solve the problems in the conventional technology.

According to one aspect of an embodiment, a distribution apparatus includes a receiving unit configured to receive an acquisition request for a first content; and a distributing unit configured to distribute the first content displayed with a second content and control information that causes a region of the second content that does not overlap the first content to be displayed in a selectable state and causes a region of the second content overlapping the first content to be displayed so as to overlap the first content in a non-selectable state, when the acquisition request is received by the receiving unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
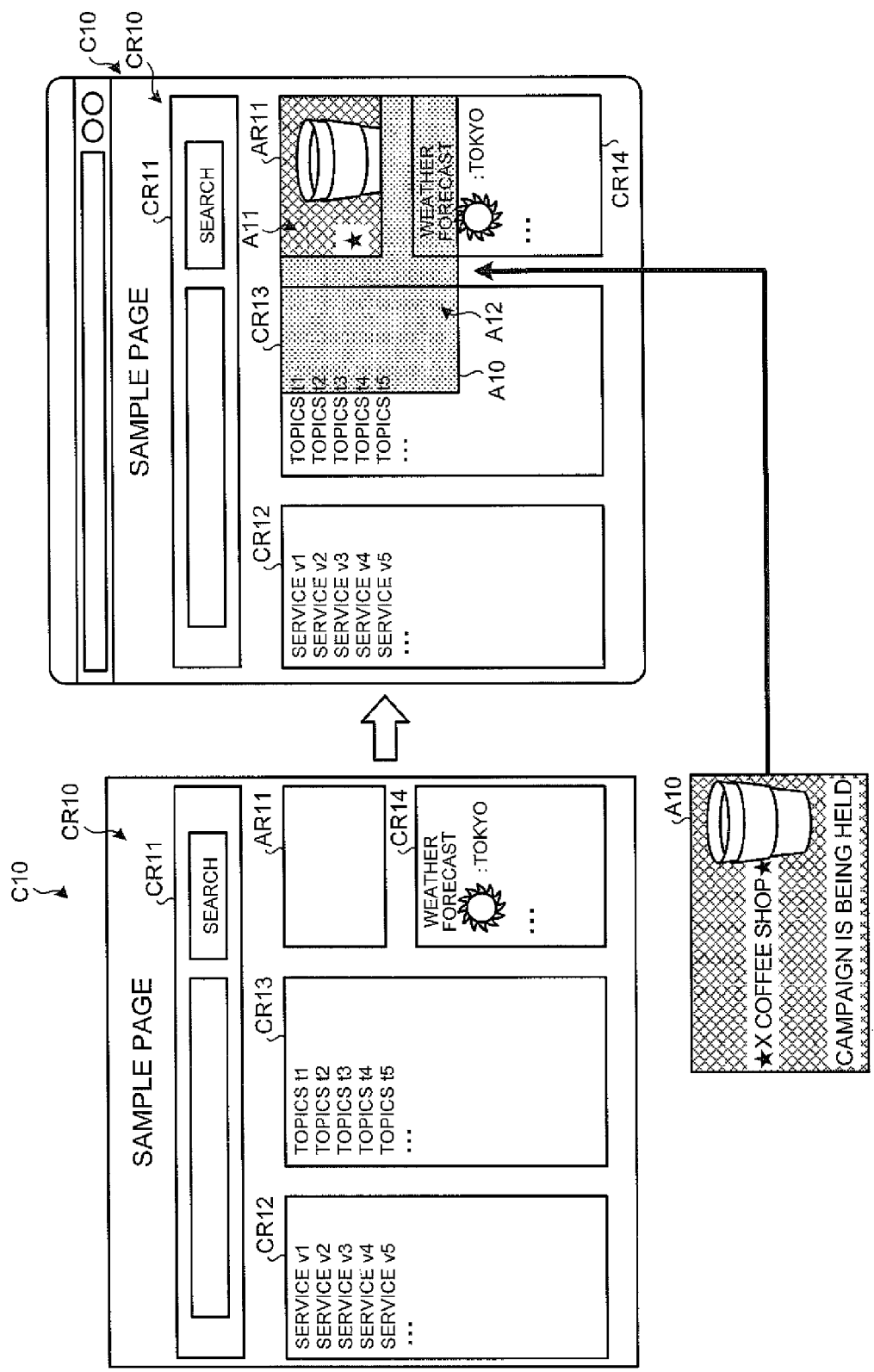
FIG. 1 is a diagram illustrating an example of an advertisement displaying process according to an embodiment.

Hereinafter, modes (hereinafter referred to as "embodiments") of implementing a distribution apparatus, a terminal apparatus, a distribution method, and a distribution program according to the present application will be described in detail with reference to the drawings. The distribution apparatus, the terminal apparatus, the distribution method, and the distribution program according to the present application are not limited to these embodiments. In the respective embodiments below, the same constituent elements are denoted by the same reference numerals, and redundant description thereof will not be provided.

1. Advertisement Displaying Process

First, an example of an advertisement displaying process according to an embodiment will be described with reference to FIG. 1. FIG. 1 is a diagram illustrating an example of an advertisement displaying process according to an embodiment. FIG. 1 illustrates an example in which a terminal apparatus 10 described later displays a webpage C10 and advertising content A10 in a web browser.

As illustrated in FIG. 1, the webpage C10 includes a content display region CR10 and an advertisement display region AR11. The content display region CR10 includes content display regions CR11 to CR14 in which various types of information such as articles are displayed. The advertisement display region AR11 is referred to as an advertisement space or the like, in which advertising content is displayed. In general, the advertisement display region AR11 is provided at a fixed position of the webpage C10. A region of the webpage C10 other than the advertisement display region AR11 corresponds to the content display region CR10. For example, a background region of the webpage C10 other than the content display regions CR11 to CR14 and the advertisement display region AR11 corresponds to the content display region CR10.

Moreover, links to other webpages other than the webpage C10 may be embedded in various types of information displayed in the content display regions CR11 to CR14. In the example of FIG. 1, "service v1" to "service v5" displayed in the content display region CR12 and "topics t1" to "topics t5" displayed in the content display region CR13 correspond to anchor text in which links to other webpages are embedded.

FIG. 1 illustrates an example in which anchor text is displayed in the webpage C10. However, buttons or images in which links to other webpages may be displayed in the webpage C10. Hereinafter, a region in which anchor text, buttons, images, and the like having links to other webpages embedded therein are displayed is sometimes referred to as a link region.

The advertising content A10 is a still image or a moving image, in which a link to an advertisement page provided by an advertiser is embedded. For example, in the advertising content A10 illustrated in FIG. 1, a link to an advertisement page provided by an advertiser "X coffee shop" is embedded. An advertisement page which is a link destination of the advertising content A10 is sometimes referred to as a landing page or the like.

As illustrated in FIG. 1, the terminal apparatus 10 according to the embodiment displays the webpage C10 and the advertising content A10 in the web browser so that the advertising content A10 partially overlaps the advertisement display region AR11.

Specifically, the terminal apparatus 10 displays the advertising content A10 so as to partially overlap the entire advertisement display region AR11. Moreover, the terminal apparatus 10 displays a region A11 of the advertising content A10 overlapping the advertisement display region AR11 in a clickable state. In other words, the terminal apparatus 10 displays the region A11 of the advertising content A10 that does not overlap the content display region CR10 in a clickable state. In this case, the terminal apparatus 10 does not process the region A11 but displays an image itself corresponding to the region A11. For example, the terminal apparatus 10 displays the region A11 of the advertising content A10 in the advertisement display region AR11.

Moreover, the terminal apparatus 10 displays a region A12 of the advertising content A10 that does not overlap the advertisement display region AR11 in a non-clickable state. In other words, the terminal apparatus 10 displays the region A12 of the advertising content A10 overlapping the content display region CR10 in a non-clickable state. In this case, the terminal apparatus 10 displays the region A12 of the advertising content A10 and the content display region CR10 so as to overlap so that the user can view both the region A12 of the advertising content A10 and the content display region CR10. In the example of FIG. 1, the terminal apparatus 10 processes the region A12 of the advertising content A10 into pixels of one color such as gray and displays the processed region A12 and the content display region CR10 so as to overlap. In this manner, the terminal apparatus 10 displays the region A12 of the advertising content A10 as a shadow positioned behind the content display region CR10. Moreover, the terminal apparatus 10 displays a link region of the webpage C10 overlapping the region A12 of the advertising content A10 in a clickable state. In the example of FIG. 1, the terminal apparatus 10 displays the anchor text "topics t3" to "topics t5" overlapping the region A12 in a clickable state.

The "clickable state" indicates a state where content such as advertising content can be selected and a state where when clicked, the webpage transitions to another webpage (including an advertisement page). Moreover, the "non-clickable state" indicates a state where content such as advertising content cannot be selected and a state where even if clicked, the webpage does not transition to another webpage (including an advertisement page). For example, when the region A11 of the advertising content A10 is clicked on, the terminal apparatus 10 accesses an advertisement page sa that the webpage C10 transitions to the advertisement page. On the other hand, even when the region A12 of the advertising content A10 is clicked on, the terminal apparatus 10 does not access the advertisement page but displays the webpage C10. However, when anchor text (for example, "topics t3" or the like) displayed so as to overlap the region A12 of the advertising content A10 is clicked on, the terminal apparatus 10 accesses a link destination of the clicked anchor text.

In this manner, the terminal apparatus 10 according to the embodiment displays the region A11 of the advertising content A10 that does not overlap the content display region CR10 in a clickable state. By doing so, since the webpage can transition to the advertisement page via the advertising content A10, the terminal apparatus 10 can display an advertisement beneficial to an advertiser that provides the advertising content A10. Moreover, even when the webpage C10 and the advertising content A10 are displayed so as to overlap, the terminal apparatus 10 does not disable the link region of the webpage C10. Due to this, since the state where the user can operate the webpage C10 is maintained, the terminal apparatus 10 can display advertisements beneficial to the webpage distributor.

Further, the terminal apparatus 10 according to the embodiment displays the advertising content A10 so as to overlap the content display region CR10. In the example of FIG. 1, the terminal apparatus 10 displays the region A12 of the advertising content A10 as a shadow. Due to this, since the advertising content A10 can be displayed in a region other than the advertisement display region AR11 provided at a fixed position of the webpage C10, the terminal apparatus 10 can display the advertising content A10 so as to give a strong impression to users. For example, if the advertising content A10 is just displayed in the advertisement display region AR11, the advertising content A10 is rarely noticed by the user unless the advertisement display region AR11 falls into the sight of users. However, since the terminal apparatus 10 displays the region A12 of the advertising content A10 in a region other than the advertisement display region AR11 as a shadow, the terminal apparatus 10 can display the advertising content A10 so as to be noticed by users even if the advertisement display region AR11 does not fall into the sight of users. As a result, the terminal apparatus 10 can improve the advertising effect of the advertising content A10.

From the above, the terminal apparatus 10 according to the embodiment can display advertisements which are beneficial to both the webpage distributor and the advertiser and which provide a high advertising effect.

Hereinafter, the terminal apparatus 10 and the like that realize the above-described advertisement displaying process will be described. In the following description, such a region of an advertising content displayed in a clickable state as the region A11 is sometimes referred to as a "clickable region," and such a region displayed in a non-clickable state as the region A12 is sometimes referred to as a "non-clickable region". Moreover, although not described above, control information for controlling a display mode of the webpage C10 and the advertising content A10 is included in the webpage C10. Moreover, the terminal apparatus 10 performs the advertisement displaying process according to the control information. The control information will be described later.

2. Configuration of Advertisement Distribution System

Figure 2:
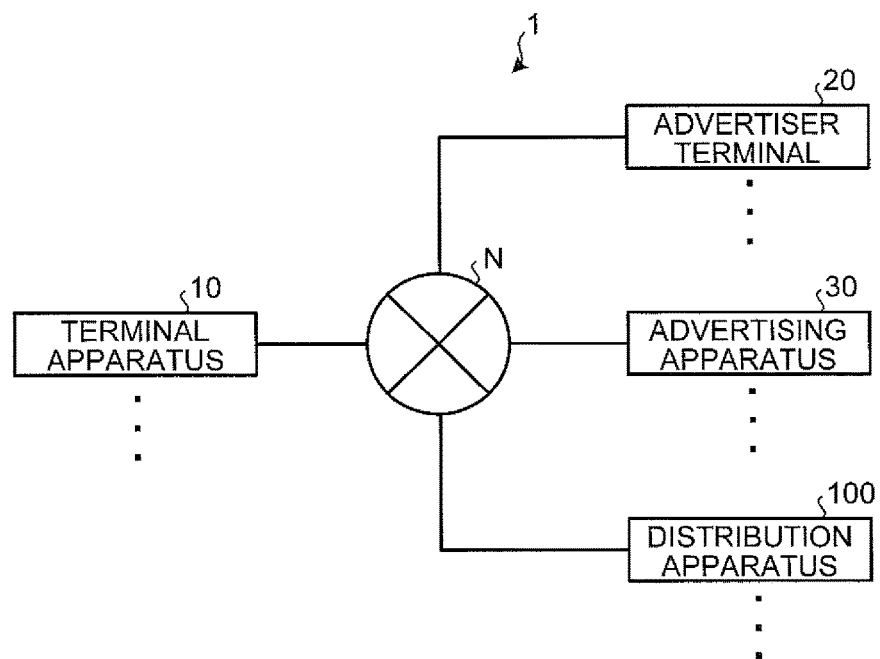
FIG. 2 is a diagram illustrating a configuration example of an advertisement distribution system according to an embodiment.

Next, a configuration of an advertisement distribution system according to the embodiment will be described with reference to FIG. 2. FIG. 2 is a diagram illustrating a configuration example of an advertisement distribution system 1 according to the embodiment. As illustrated in FIG. 2, the advertisement distribution system 1 includes the terminal apparatus 10, an advertiser terminal 20, an advertising apparatus 30, and a distribution apparatus 100. The terminal apparatus 10, the advertiser terminal 20, the advertising apparatus 30, and the distribution apparatus 100 are connected with cables or wirelessly so as to be able to communicate via a network N. In the advertisement distribution system 1 illustrated in FIG. 2, a plurality of terminal apparatuses 10, a plurality of advertiser terminals 20, a plurality of advertising apparatuses 30, and a plurality of distribution apparatuses 100 may be included.

The terminal apparatus 10 is an information processing apparatus used by a user who browses webpages. For example, the terminal apparatus 10 is a desktop personal computer (PC), a notebook PC, a tablet terminal, a mobile phone, personal digital assistant (PDA), or the like. Moreover, the terminal apparatus 10 acquires a webpage from the distribution apparatus 100 according to an operation of the user and displays the acquired webpage. Further, when an advertisement acquisition command described later is included in a webpage, the terminal apparatus 10 acquires advertising content from the advertising apparatus 30 and displays the acquired advertising content together with the webpage.

The advertiser terminal 20 is an information processing apparatus used by an advertiser. For example, the advertiser terminal 20 is a desktop PC, a notebook PC, a tablet terminal, a mobile phone, a PDA, or the like. Moreover, the advertiser terminal 20 submits advertising content to the advertising apparatus 30 according to an operation of the advertiser. For example, the advertiser terminal 20 submits a still image, a moving image, text data, a uniform resource locator (URL) for accessing an advertisement page distributed by an advertiser server managed by an advertiser, and the like to the advertising apparatus 30 as the advertising content.

The advertiser may sometimes ask an agent to submit the advertising content. In this case, the agent submits the advertising content to the advertising apparatus 30. In the following description, an expression "advertiser" is a concept that includes an agent as well as an advertiser, and an expression "advertiser terminal" is a concept that includes an agent apparatus used by the agent as well as the advertiser terminal 20.

The advertising apparatus 30 is a server apparatus that distributes the advertising content submitted from the advertiser terminal 20. For example, when advertising content is accessed from the terminal apparatus 10, the advertising apparatus 30 distributes the advertising content to the terminal apparatus 10.

The distribution apparatus 100 is a web server or the like that distributes a webpage to the terminal apparatus 10. For example, the distribution apparatus 100 distributes various webpages related to a news site, an auction site, a weather forecast site, a shopping site, a finance (stock price) site, a route search site, a map providing site, a travel site, a restaurant guide site, a blog website, and the like.

The webpage distributed by the distribution apparatus 100 is formed, for example, by an HTML file described in a hypertext markup language (HTML), an XML file described in an extensible markup language (XML), or the like. Moreover, control information for controlling a display mode of a webpage and advertising content is included in the webpage distributed by the distribution apparatus 100. The control information is described in an HTML file or the like that forms a webpage by a script language such as, for example, JavaScript (registered trademark) or cascading style sheets (CSS).

Moreover, an advertisement acquisition command is included in the webpage distributed by the distribution apparatus 100. For example, the URL or the like of the advertising apparatus 30 is described in the HTML file or the like that forms the webpage as the advertisement acquisition command. In this case, the terminal apparatus 10 acquires advertising content from the advertising apparatus 30 by accessing the URL described in the HTML file or the like.

Although actually, various types of data distributed from the distribution apparatus 100 to the terminal apparatus 10 are HTML files, images, and the like that form a webpage, various types of data distributed from the distribution apparatus 100 to the terminal apparatus 10 will be sometimes referred to a "webpage".

3. Configuration of Advertising Apparatus

Figure 3:
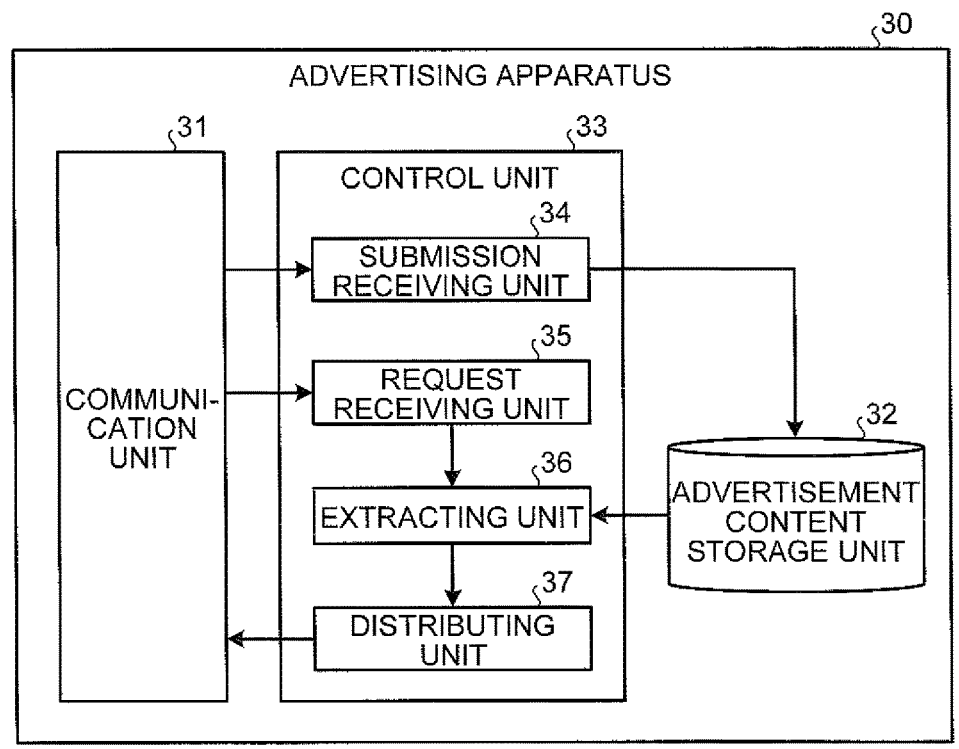
FIG. 3 is a diagram illustrating a configuration example of an advertising apparatus according to an embodiment.

Next, a configuration of the advertising apparatus 30 according to the embodiment will be described with reference to FIG. 3. FIG. 3 is a diagram illustrating a configuration example of the advertising apparatus 30 according to the embodiment. As illustrated in FIG. 3, the advertising apparatus 30 includes a communication unit 31, an advertisement content storage unit 32, and a control unit 33.

The communication unit 31 is realized by a network interface card (NIC) or the like, for example. The communication unit 31 is connected with cables or wirelessly to the network N so as to transmit and receive information to and from the terminal apparatus 10, the advertiser terminal 20, and the distribution apparatus 100.

The advertisement content storage unit 32 is realized by a semiconductor memory device such as a random access memory (RAM) or a flash memory or a storage device such as a hard disk or an optical disc, for example. The advertisement content storage unit 32 stores various types of information related to the advertising content submitted from the advertiser terminal 20.

Figures 4, 5:
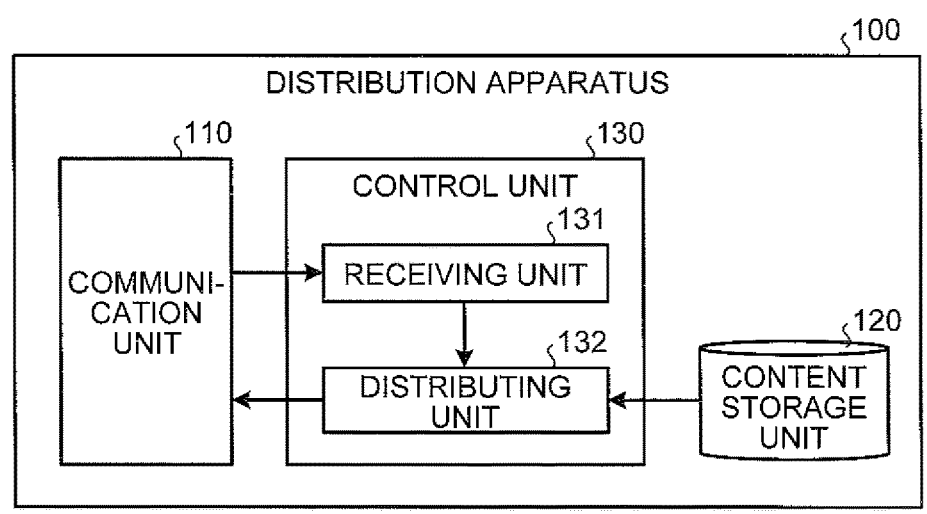
FIG. 4 is a diagram illustrating an example of an advertising content storage unit according to an embodiment.
FIG. 5 is a diagram illustrating a configuration example of a distribution apparatus according to an embodiment.

FIG. 4 illustrates an example of the advertisement content storage unit 32 according to the embodiment. In the example illustrated in FIG. 4, the advertisement content storage unit 32 has items such as "advertiser ID," "advertising content," "bidding price," and "click through rate (CRT)".

The "advertiser ID" indicates identification information for identifying the advertiser or the advertiser terminal 20. The "advertising content" indicates the advertising content submitted from the advertiser terminal 20. In FIG. 4, although an example in which conceptual information "A10" is stored in the "advertising content" has been illustrated, actually, a still image, a moving image, text data, a URL, or a file path name indicating a storage location thereof is stored in the "advertising content".

The "bidding price" indicates an advertising rate designated when the advertiser submits advertising content. For example, the "bidding price" corresponds to a unit price paid from an advertiser to an advertisement distributor (for example, the administrator of the advertising apparatus 30 or the distribution apparatus 100) when the advertising content is clicked once by a user.

The "CTR" indicates a value obtained by dividing the number of clicks on the advertising content by the number of times the advertising content is displayed. When the advertising content has not been distributed to the terminal apparatus 10, a predetermined fixed value, an average CTR value of all advertising content, an average CTR value of all advertising content belonging to the same advertisement category (for example, automobile or travel), or the like is stored in the CTR of the advertising content. Moreover, a predicted CTR predicted from a CTR prediction model or the like may be stored in the "CTR". Such a predicted CTR is predicted based on the type of advertising content, the type of the webpage in which the advertising content is displayed, or the like.

That is, FIG. 4 illustrates an example in which an advertiser identified by an advertiser ID "B10" has designated a bidding price "100" and submitted advertising content "A10". Moreover, FIG. 4 illustrates an example in which the CTR of the advertising content "A10" is "0.02".

The control unit 33 is realized, for example, when a central processing unit (CPU), a micro processing unit (MPU), or the like executes various programs stored in an internal storage device of the advertising apparatus 30 using RAM as a work area. Moreover, the control unit 33 is realized by an integrated circuit such as, for example, an application specific integrated circuit (ASIC) or a field programmable gate array (FPGA).

As illustrated in FIG. 3, the control unit 33 includes a submission receiving unit 34, a request receiving unit 35, an extracting unit 36, and a distributing unit 37 and realizes or executes information processing functions and operations described below. The internal configuration of the control unit 33 is not limited to the configuration illustrated in FIG. 3, but other configuration may be employed if the control unit 33 performs information processing described later. Moreover, a connection relation of respective processing units of the control unit 33 is not limited to the connection relation illustrated in FIG. 3 but other connection relation may be employed.

The submission receiving unit 34 receives a submission of advertising content from the advertiser terminal 20. Specifically, the submission receiving unit 34 receives a submission of advertising content together with a designation of a bidding price. The submission receiving unit 34 stores the received bidding price and advertising content in the advertisement content storage unit 32 in correlation with the advertiser ID corresponding to the advertiser who submitted the advertising content.

The request receiving unit 35 receives an advertising content acquisition request from the terminal apparatus 10. For example, the request receiving unit 35 receives a HTTP request as the advertising content acquisition request.

When the advertising content acquisition request is received by the request receiving unit 35, the extracting unit 36 extracts distribution candidate advertising content from the advertisement content storage unit 32. For example, the extracting unit 36 preferentially extracts advertising content of which the bidding price or CTR is high or advertising content of which both the bidding price and the CTR are high among the advertising content stored in the advertisement content storage unit 32.

The distributing unit 37 distributes the advertising content stored in the advertisement content storage unit 32. Specifically, the distributing unit 37 distributes the advertising content extracted by the extracting unit 36 to the terminal apparatus 10 that has transmitted the advertising content acquisition request.

4. Configuration of Distribution Apparatus

Next, a configuration of the distribution apparatus 100 according to the embodiment will be described with reference to FIG. 5. FIG. 5 is a diagram illustrating a configuration example of the distribution apparatus 100 according to the embodiment. As illustrated in FIG. 5, the distribution apparatus 100 includes a communication unit 110, a content storage unit 120, and a control unit 130.

The communication unit 110 is realized by a NIC or the like, for example. The communication unit 110 is connected with cables or wirelessly to the network N so as to transmit and receive information to and from the terminal apparatus 10 and the advertising apparatus 30.

The content storage unit 120 is realized by a semiconductor memory device such as a RAM or a flash memory or a storage device such as a hard disk or an optical disc, for example. The content storage unit 120 stores a webpage which is an example of content. For example, the content storage unit 120 stores an HTML file that forms a webpage and a still image and a moving image displayed in the webpage.

An advertisement acquisition command for acquiring advertising content is included in the webpage stored in the content storage unit 120. Moreover, control information described in a script language such as JavaScript (registered trademark) or CSS is included in the webpage stored in the content storage unit 120. The control information controls a display mode of the webpage and the advertising content. Specifically, the control information according to the embodiment controls a display position of the advertising content. Moreover, the control information specifies a region of the advertising content that does not overlap the webpage as a clickable region. The control information controls so that the clickable region of the advertising content is displayed in a clickable state. Moreover, the control information specifies a region of the advertising content overlapping the webpage as a non-clickable region. The control information controls so that the non-clickable region of the advertising content is displayed so as to overlap the webpage in a non-clickable state. Moreover, the control information according to the embodiment controls so that a region of the advertising content overlapping the advertisement display region is specified as a clickable region when an advertisement display region for displaying advertising content is included in the webpage. In other words, the control information specifies the clickable region and the non-clickable region of the advertising content assuming that the advertisement display region is not a webpage. For example, in the example of FIG. 1, the control information specifies the clickable region and the non-clickable region of the advertising content assuming that the content display region CR10 is a webpage. Moreover, the control information according to the embodiment controls so that the non-clickable region of the advertising content is displayed as a shadow so that as in the example of FIG. 1, both the non-clickable region of the advertising content and the webpage can be viewed by users and the link region of the webpage is in a clickable state.

The control unit 130 is realized, for example, when a CPU, an MPU, or the like executes various programs (corresponding to an example of a distribution program) stored in an internal storage device of the distribution apparatus 100 using RAM as a work area. Moreover, the control unit 130 is realized by an integrated circuit such as an ASIC or a FPGA, for example.

As illustrated in FIG. 5, the control unit 130 includes a receiving unit 131 and a distributing unit 132 and realizes or executes information processing functions and operations described below. The internal configuration of the control unit 130 is not limited to the configuration illustrated in FIG. 5, but other configuration may be employed if the control unit 130 performs information processing described later. Moreover, a connection relation of respective processing units of the control unit 130 is not limited to the connection relation illustrated in FIG. 5 but other connection relation may be employed.

The receiving unit 131 receives a webpage acquisition request from the terminal apparatus 10. For example, the receiving unit 131 receives a HTTP request as the webpage acquisition request.

When a webpage acquisition request is received by the receiving unit 131, the distributing unit 132 distributes the webpage and the control information to the terminal apparatus 10. Specifically, the distributing unit 132 acquires a webpage corresponding to the acquisition request from the content storage unit 120 and distributes the acquired webpage to the terminal apparatus 10. As described above, since control information is included in the webpage stored in the content storage unit 120, the distributing unit 132 distributes the webpage and the control information.

The content storage unit 120 may store the webpage and the control information individually rather than storing the webpage including the control information. For example, the content storage unit 120 may store an HTML file that forms a webpage in correlation with a file in which the control information is described. In this case, the distributing unit 132 distributes both the webpage and the control information to the terminal apparatus 10.

5. Configuration of Terminal Apparatus

Figure 6:
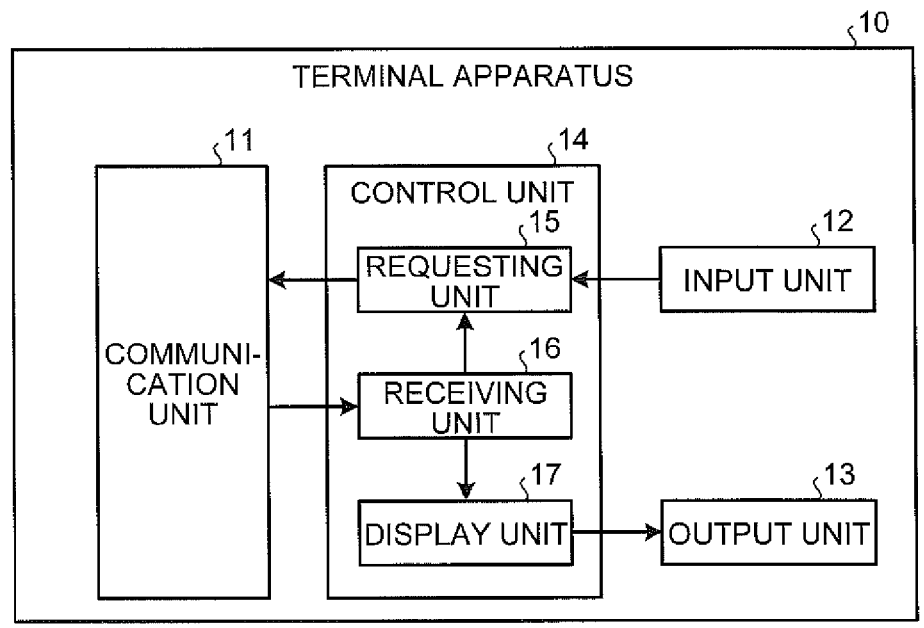
FIG. 6 is a diagram illustrating a configuration example of a terminal apparatus according to an embodiment.

Next, a configuration of the terminal apparatus 10 according to the embodiment will be described with reference to FIG. 6. FIG. 6 is a diagram illustrating a configuration example of the terminal apparatus 10 according to the embodiment. As illustrated in FIG. 6, the terminal apparatus 10 includes a communication unit 11, an input unit 12, an output unit 13, and a control unit 14.

The communication unit 11 is realized by a NIC or the like, for example. The communication unit 11 is connected with cables or wirelessly to the network N so as to transmit and receive information to and from the advertising apparatus 30 and the distribution apparatus 100.

The input unit 12 is an input device that receives various operations from users. For example, the input unit 12 is realized by a keyboard, a mouse, an operation key, or the like. The output unit 13 is a display device for displaying various types of information. For example, the output unit 13 is realized by a liquid crystal display or the like. When a touch panel is employed in the terminal apparatus 10, the input unit 12 and the output unit 13 are integrated.

The control unit 14 is realized, for example, when a CPU, an MPU, or the like executes various programs (corresponding to an example of a display program) stored in an internal storage device of the terminal apparatus 10 using RAM as a work area. For example, the programs correspond to an application program called a web browser. Moreover, the control unit 14 is realized by an integrated circuit such as an ASIC or a FPGA, for example.

As illustrated in FIG. 6, the control unit 14 includes a requesting unit 15, a receiving unit 16, and a display unit 17 and realizes or executes information processing functions and operations described below. The internal configuration of the control unit 14 is not limited to the configuration illustrated in FIG. 6, but other configuration may be employed if the control unit 14 performs information processing described later. Moreover, a connection relation of respective processing units of the control unit 14 is not limited to the connection relation illustrated in FIG. 6 but other connection relation may be employed.

The requesting unit 15 transmits a webpage acquisition request to the distribution apparatus 100 according to a user operation input using the input unit 12. Moreover, the requesting unit 15 transmits an advertising content acquisition request to the advertising apparatus 30 when an advertisement acquisition command is included in the webpage received by the receiving unit 16.

The receiving unit 16 receives a webpage and advertising content. Specifically, the receiving unit 16 receives a webpage from the distribution apparatus 100 that has responded to the webpage acquisition request transmitted by the requesting unit 15. In this case, when an advertisement acquisition command is included in the webpage, the receiving unit 16 instructs the requesting unit 15 to transmit the advertising content acquisition request. Moreover, the receiving unit 16 receives advertising content from the advertising apparatus 30 that has responded to the advertising content acquisition request transmitted by the requesting unit 15.

The display unit 17 displays a webpage and advertising content on the output unit 13 according to the control information included in the webpage received by the receiving unit 16. Specifically, the display unit 17 displays the webpage. Moreover, the display unit 17 displays a region of the advertising content that does not overlap the webpage in a clickable state and displays a region of the advertising content overlapping the webpage together with the webpage in a non-clickable state. In this case, the display unit 17 displays a region of the advertising content overlapping the advertisement display region included in the webpage in a clickable state. Moreover, the display unit 17 according to the embodiment displays the region of the advertising content overlapping the webpage as a shadow.

6. Other Display Example

Figure 7:
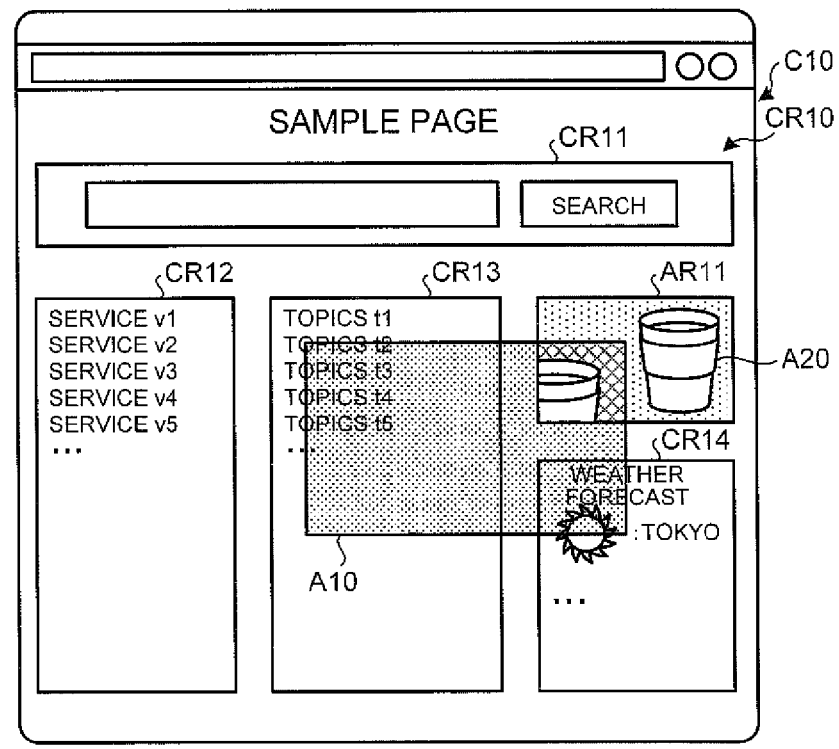
FIG. 7 is a diagram illustrating an example of an advertisement displaying process according to an embodiment.
Figure 8:
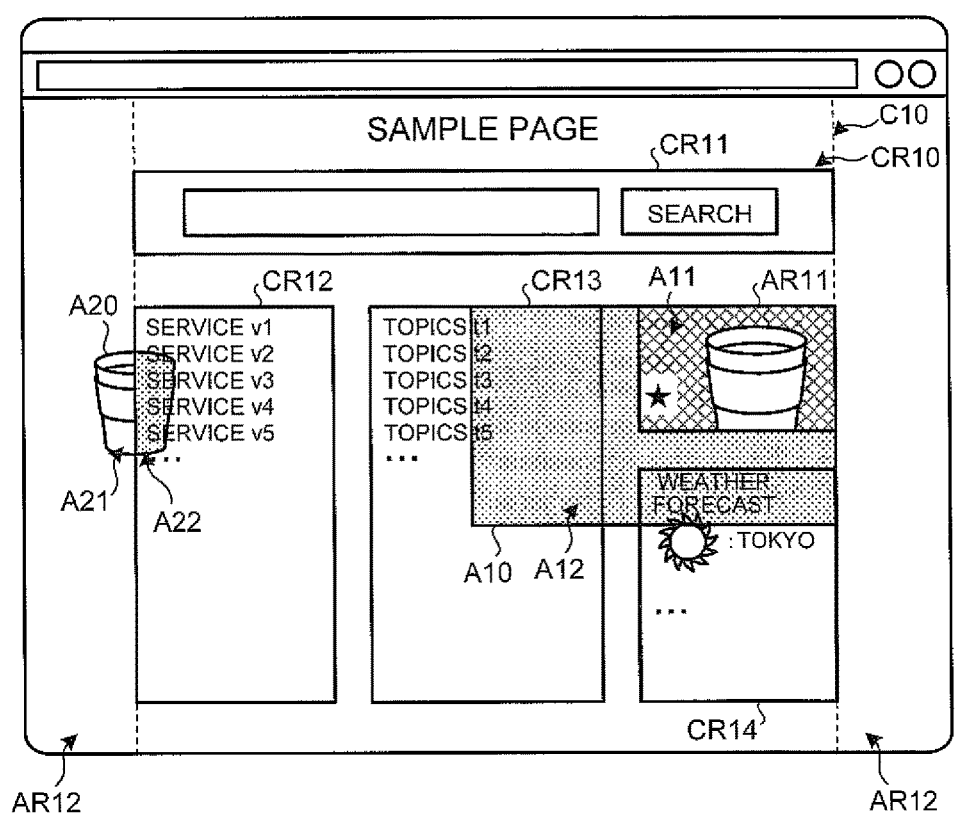
FIG. 8 is a diagram illustrating an example of an advertisement displaying process according to an embodiment.

An advertisement displaying process of the terminal apparatus 10 has been described using the display mode illustrated in FIG. 1. However, the embodiment is not limited to this, but the terminal apparatus 10 may perform the advertisement displaying process according to another display mode. This will be described with reference to FIGS. 7 and 8. FIGS. 7 and 8 are diagrams illustrating an example of the advertisement displaying process according to the embodiment.

First, the example of FIG. 7 will be described. In the example of FIG. 7, the terminal apparatus 10 receives advertising content A10 and A20 from the advertising apparatus 30. In this example, it is assumed that the advertising content A10 and A20 are submitted to the advertising apparatus 30 by the same advertiser. For example, a link to the same advertisement page is embedded in both advertising content A10 and A20. Moreover, the terminal apparatus 10 displays the advertising content A10 so as to partially overlap a portion of the advertisement display region AR11. Moreover, the terminal apparatus 10 displays the advertising content A20 in the advertisement display region AR11 so as not to overlap the content display region CR10.

In this manner, the terminal apparatus 10 may display a portion of the advertising content A10 as a shadow and display the entire advertising content A20 in a visible state. By doing so, the terminal apparatus 10 can allow users to recognize the advertisers and the advertising items corresponding to the advertising content A10 and A20. For example, in the example of FIG. 7, it is assumed that a coffee cup represented by the advertising content A20 is the logo of X coffee shop and is widely known to the public. In this case, users can recognize that the advertiser is the X coffee shop upon viewing the advertising content A20. That is, the terminal apparatus 10 can give a strong impression of an advertisement to users by displaying the advertising content A10 and allow users to recognize the advertiser and the advertising item by displaying the advertising content A20. By doing so, the terminal apparatus 10 can improve the advertising effect of the advertising content A10 and A20.

In the example of FIG. 7, the submission receiving unit 34 of the advertising apparatus 30 receives a plurality of advertising contents displayed simultaneously in the webpage C10 from the advertiser terminal 20. For example, the submission receiving unit 34 causes the advertiser to select whether the advertising contents are to be displayed in the display mode illustrated in FIG. 7. When the display mode illustrated in FIG. 7 is selected, the submission receiving unit 34 causes the advertiser to designate whether the advertising content is to be displayed partially in the advertisement display region AR11 or the advertising content is to be displayed entirely in the advertisement display region AR11 and receives a submission of the advertising content.

Moreover, the distributing unit 132 of the distribution apparatus 100 distributes the webpage C10 including an advertisement acquisition command for acquiring a plurality of advertising contents to the terminal apparatus 10. When the terminal apparatus 10 accesses the advertising apparatus 30 based on the advertisement acquisition command, the distributing unit 37 of the advertising apparatus 30 distributes the plurality of advertising contents submitted with the display mode illustrated in FIG. 7 selected to the terminal apparatus 10. In this case, the distributing unit 37 distributes the plurality of advertising contents to the terminal apparatus 10 together with display identification information for identifying whether the advertising content is to be displayed partially in the advertisement display region or the advertising content is to be displayed entirely in the advertisement display region. Moreover, the distributing unit 132 distributes the webpage C10 including the control information for displaying the plurality of advertising contents in the display mode illustrated in FIG. 7 to the terminal apparatus 10. The control information controls the display mode of the plurality of advertising contents received from the advertising apparatus 30 based on the display identification information.

In the example illustrated in FIG. 1, the terminal apparatus 10 may display the entire advertisement display region AR11 in a clickable state. Specifically, the terminal apparatus 10 may display the advertisement display region AR11 so that the region A11 of the advertising content A10 and a region where the advertising content A20 is not displayed are also in a clickable state. For example, the terminal apparatus 10 may embed a link to an advertisement page which is a link destination of the advertising content A10 and A20 in the entire advertisement display region AR11. In this way, since the terminal apparatus 10 displays the entire advertisement display region AR11 in which advertising content is generally displayed in a clickable state, it is possible to improve usability.

Moreover, the size of the advertising content A10 illustrated in FIG. 1 may be the same as that of the advertisement display region AR11. By doing so, since the terminal apparatus 10 can allow users to easily understand that the advertising content A10 of which a partial region is displayed as a shadow is an advertisement, the terminal apparatus 10 can improve the advertising effect.

Subsequently, the example of FIG. 8 will be described. In the example of FIG. 8, the terminal apparatus 10 receives the advertising content A10 and A20 from the advertiser terminal 20 similarly to the example of FIG. 7. Here, it is assumed that a display width of the webpage C10 is determined in advance. Moreover, it is assumed that the terminal apparatus 10 displays the webpage C10 in a web browser that is wider than the display width of the webpage C10. In this case, a non-use region AR12 in which the webpage C10 is not displayed is formed at both ends of the web browser.

In the example of FIG. 8, the terminal apparatus 10 displays the advertising content A20 so as to partially overlap the non-use region AR12. Specifically, the terminal apparatus 10 displays a region A21 of the advertising content A20 overlapping the non-use region AR12 in a clickable state. Moreover, the terminal apparatus 10 displays a region A22 of the advertising content A20 that does not overlap the non-use region AR12 as a shadow in a non-clickable state. In this case, the terminal apparatus 10 displays a link region of the webpage C10 overlapping the region A22 of the advertising content A20 in a clickable state. In the example of FIG. 8, the terminal apparatus 10 displays anchor text "service v3" to "service v5" displayed in the content display region CR12 in a clickable state.

In this manner, since the terminal apparatus 10 displays a portion of the advertising content A20 in a clickable state so as to overlap the non-use region AR12, it is possible to effectively utilize the display region of the web browser for advertisement display. Moreover, since the terminal apparatus 10 displays the advertising content A20 in the non-use region AR12 other than the advertisement display region AR11 in which advertising content is generally displayed at a fixed position, it is possible to give a strong impression of the advertising content A20 to users. As a result, the terminal apparatus 10 can improve the advertising effect of the advertising content A20.

In the example of FIG. 8, the submission receiving unit 34 of the advertising apparatus 30 receives a submission of advertising content after it is designated whether advertising content is to be displayed partially in the advertisement display region AR11 or advertising content is to be displayed partially in the non-use region AR12. Moreover, the distributing unit 37 of the advertising apparatus 30 distributes the plurality of advertising contents to the terminal apparatus 10 together with display identification information for identifying whether advertising content is to be displayed partially in the advertisement display region AR11 or advertising content is to be displayed partially in the non-use region AR12. Moreover, the distributing unit 132 of the distribution apparatus 100 distributes the webpage C10 including the control information for displaying the plurality of advertising contents in the display mode illustrated in FIG. 8 to the terminal apparatus 10.

7. Flow of Advertisement Distribution Process

Figure 9:
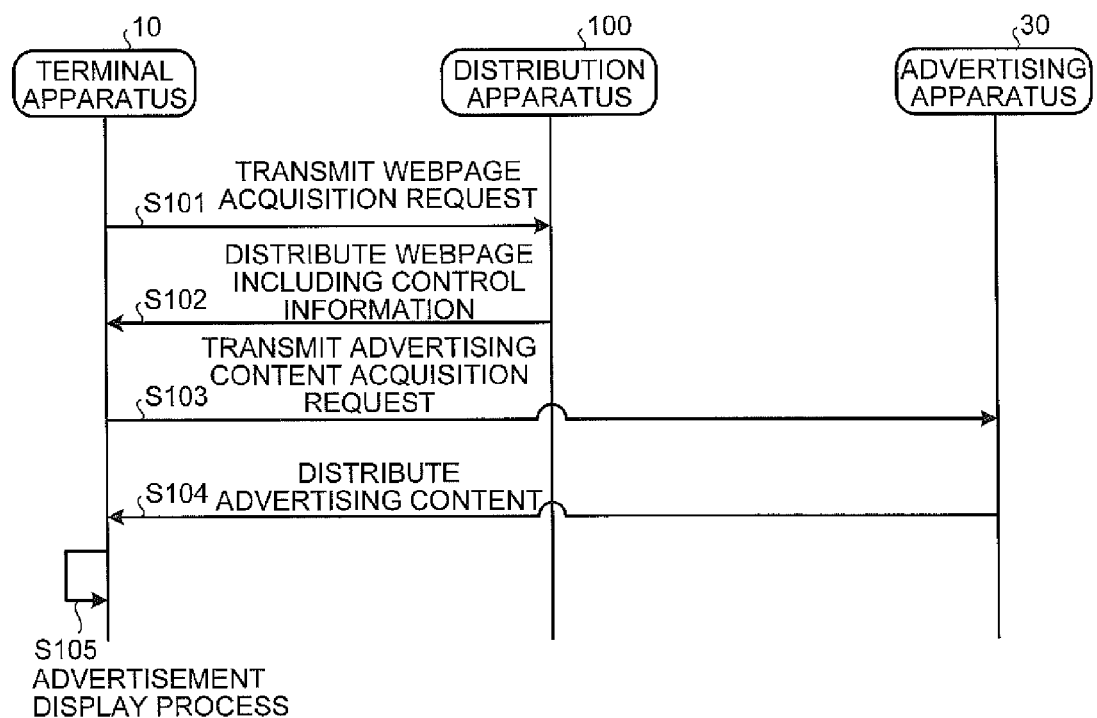
FIG. 9 is a sequence diagram illustrating the flow of an advertisement distribution process of an advertisement distribution system according to an embodiment.

Next, the flow of an advertisement distribution process of the advertisement distribution system 1 according to the embodiment will be described with reference to FIG. 9. FIG. 9 is a sequence diagram illustrating the flow of an advertisement distribution process of the advertisement distribution system 1 according to the embodiment.

As illustrated in FIG. 9, the terminal apparatus 10 transmits a webpage acquisition request to the distribution apparatus 100 according to a user operation (step S101). In response to the webpage acquisition request, the distribution apparatus 100 distributes a webpage including control information to the terminal apparatus 10 (step S102). The webpage distributed by the distribution apparatus 100 includes an advertisement acquisition command such as a URL of the advertising apparatus 30.

Subsequently, the terminal apparatus 10 transmits an advertising content acquisition request to the advertising apparatus 30 based on the advertisement acquisition command included in the webpage (step S103). In response to the advertising content acquisition request, the advertising apparatus 30 distributes advertising content to the terminal apparatus 10 (step S104).

The terminal apparatus 10 performs an advertisement displaying process of displaying the webpage and the advertising content received in step S104 according to the control information included in the webpage received in step S102 (step S105).

8. Flow of Advertisement Displaying Process

Figure 10:
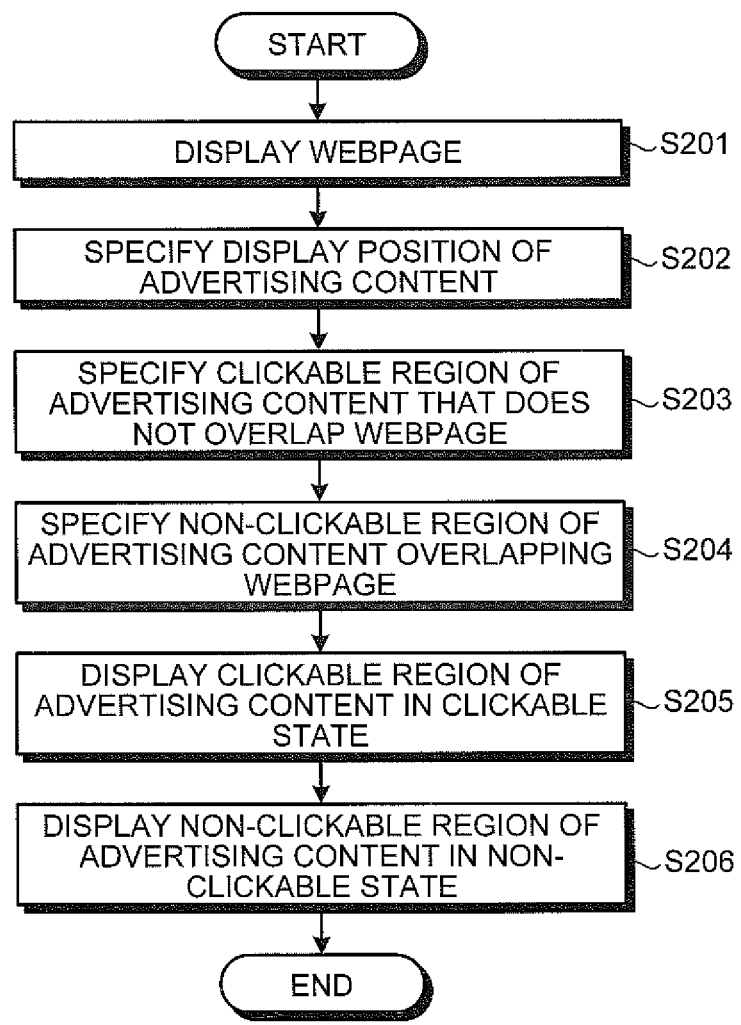
FIG. 10 is a flowchart illustrating the flow of an advertisement displaying process of a terminal apparatus according to an embodiment.

Next, the flow of the advertisement displaying process illustrated in step S105 of FIG. 9 will be described with reference to FIG. 10. FIG. 10 is a flowchart illustrating the flow of the advertisement displaying process of the terminal apparatus 10 according to the embodiment. The flow of the advertisement displaying process illustrated in FIG. 10 is performed by the display unit 17 of the terminal apparatus 10 according to the control information included in the webpage.

As illustrated in FIG. 10, the terminal apparatus 10 displays the webpage received from the distribution apparatus 100 (step S201). Subsequently, the terminal apparatus 10 specifies a display position of the advertising content received from the advertising apparatus 30 according to the control information (step S202).

Subsequently, the terminal apparatus 10 specifies a region of the advertising content that does not overlap the webpage as a clickable region based on the display position of the advertising content (step S203). In this case, when an advertisement display region is included in the webpage, the terminal apparatus 10 specifies a region of the advertising content overlapping the advertisement display region as a clickable region. Moreover, the terminal apparatus 10 specifies a region of the advertising content overlapping the webpage as a non-clickable region based on the display position of the advertising content (step S204).

The terminal apparatus 10 displays the clickable region of the advertising content in a clickable state (step S205). Moreover, the terminal apparatus 10 displays the non-clickable region of the advertising content as a shadow in a non-clickable state (step S206). In this case, the terminal apparatus 10 displays a link region of the webpage overlapping the non-clickable region of the advertising content in a clickable state.

9. Modifications

The advertisement distribution system 1 according to the above-described embodiment may be embodied in various forms other than the above embodiment. Thus, other embodiments of the advertisement distribution system 1 will be described below. The terminal apparatus 10 described below performs an advertising content displaying process according to the control information included in the webpage.

9-1. Movement of Advertising Content (1)

Figure 11:
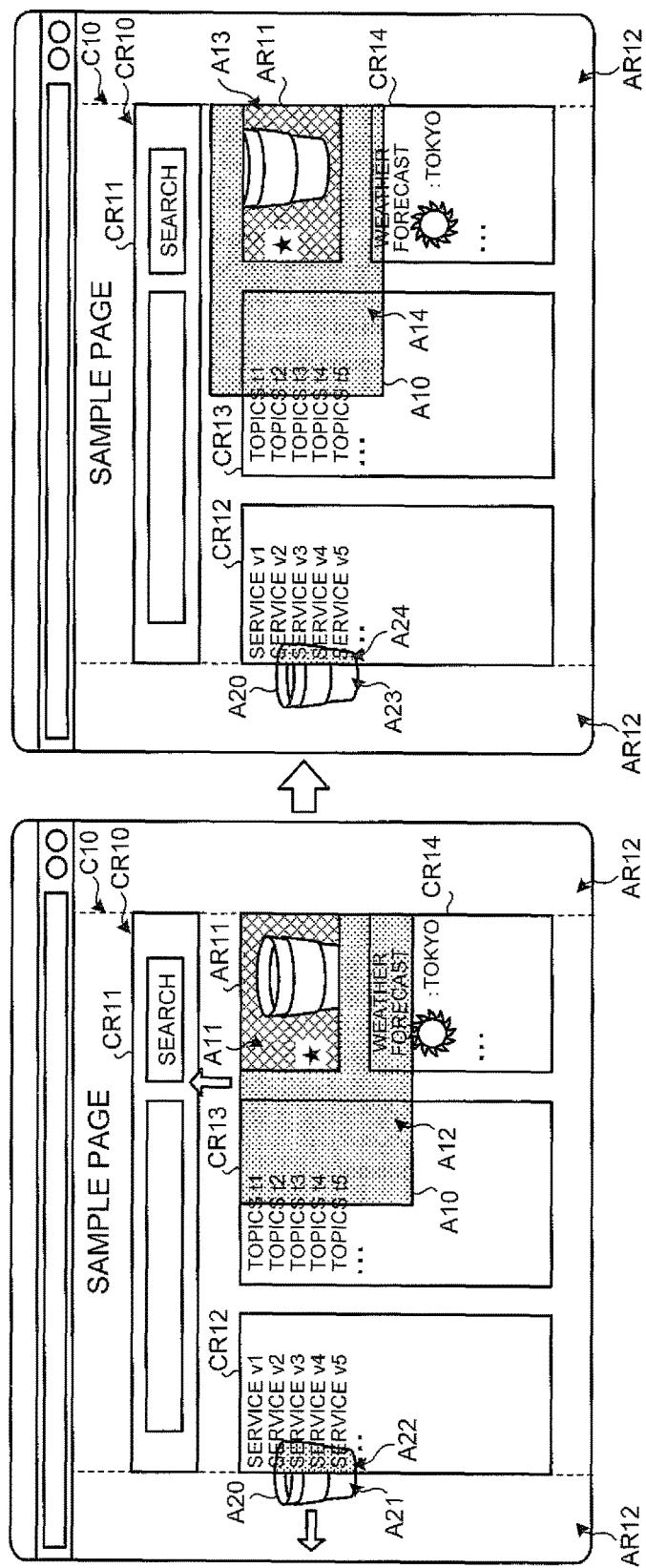
FIG. 11 is a diagram illustrating an example of an advertisement displaying process according to a modification.

In the above embodiment, the terminal apparatus 10 may move the advertising content. Moreover, the terminal apparatus 10 may change the clickable region and the non-clickable region of the advertising content according to a change in the display position of the advertising content in the webpage. This will be described with reference to FIG. 11. FIG. 11 is a diagram illustrating an example of an advertisement displaying process according to a modification.

As illustrated on the left side of FIG. 11, the terminal apparatus 10 displays the webpage C10 and the advertising content A10 and A20 similarly to the example illustrated in FIG. 8. Subsequently, the terminal apparatus 10 moves the advertising content A10 in an obliquely right upward direction on the webpage C10 and the advertising content A20 in an upward direction.

Subsequently, as illustrated on the right side of FIG. 11, the terminal apparatus 10 changes the clickable region and the non-clickable region according to a change in the display position of the advertising content A10 and A20. Specifically, the terminal apparatus 10 changes the clickable region of the advertising content A10 from the region A11 to the region A13 and changes the non-clickable region of the advertising content A10 from the region A12 to the region A14. Moreover, the terminal apparatus 10 changes the clickable region of the advertising content A20 from the region A21 to the region A23 and changes the non-clickable region of the advertising content A20 from the region A22 to the region A24. That is, the terminal apparatus 10 widens the clickable region of the advertising content A20 and narrows the non-clickable region with movement of the advertising content A20.

In this manner, since the terminal apparatus 10 changes the clickable region and the non-clickable region with movement of the advertising content A10 and A20, the terminal apparatus 10 can allow the advertising content A10 and A20 to be noticed by users. For example, in the example of FIG. 11, since the terminal apparatus 10 can gradually change the display region (corresponding to the clickable region) of the advertising content A10 and gradually change the display region of the advertising content A20, the terminal apparatus 10 can allow the advertising content A10 and A20 to be noticed by users. The embodiment is not limited to the example of FIG. 11, but the terminal apparatus 10 may move the advertising content A10 and A20 in a direction where the non-clickable region of the advertising content A10 and A20 widens. In this case, since the terminal apparatus 10 can display the advertising content A10 and A20 so that the display region gradually disappears, the terminal apparatus 10 can allow the advertising content A10 and A20 to be noticed by users. Due to this, the terminal apparatus 10 can improve the advertising effect of the advertising content A10 and A20.

In the example of FIG. 11, the distributing unit 132 of the distribution apparatus 100 distributes the webpage C10 including the control information for realizing the display mode illustrated in FIG. 11 to the terminal apparatus 10. For example, the distributing unit 132 distributes the control information for controlling a process of moving the advertising content A10 and A20 and a process of changing the clickable region and the non-clickable region of the advertising content A10 and A20.

In the example of FIG. 11, the terminal apparatus 10 may move the advertising content A10 or the advertising content A20 when a user performs a predetermined operation. For example, the terminal apparatus 10 may move the advertising content A10 when a user performs an operation (called a mouse-over) of moving a mouse cursor or the like over a display position of the advertising content A10. Similarly, the terminal apparatus 10 may move the advertising content A20 when the advertising content A20 is mouse-overed. In this case, the terminal apparatus 10 may move both advertising content A10 and A20 when any one of the advertising content A10 and A20 is mouse-overed. Moreover, once the advertising content R10 or A20 is mouse-overed, the terminal apparatus 10 may continuously move the advertising content A10 or A20 even if the advertising content A10 or A20 is not mouse-overed after that. Alternatively, the terminal apparatus 10 may move the advertising content A10 or A20 only when the advertising content A10 or A20 is mouse-overed. In this manner, since the terminal apparatus 10 changes the advertising content only when a user focuses on the advertising content, it is possible to prevent an unsightly advertisement from being displayed to users.

The embodiment is not limited to the above example, and the terminal apparatus 10 may move the advertising content A10 and the like slowly before the user performs a predetermined operation and may move the advertising content A10 and the like quickly when the user performs a predetermined operation. For example, the terminal apparatus 10 may move the advertising content A10 and the like at a predetermined moving speed or lower before the user performs a predetermined operation and may move the advertising content A10 and the like at a predetermined moving speed or higher when the user performs a predetermined operation.

In the example of FIG. 11, the terminal apparatus 10 may finally move the entire advertising content A20 to the non-use region AR12. Moreover, when the size of the advertising content A10 is equal to or smaller than the size of the advertisement display region AR11, the terminal apparatus 10 may finally move the entire advertising content A10 to the advertisement display region AR11.

9-2. Movement of Advertising Content (2)

Figure 12:
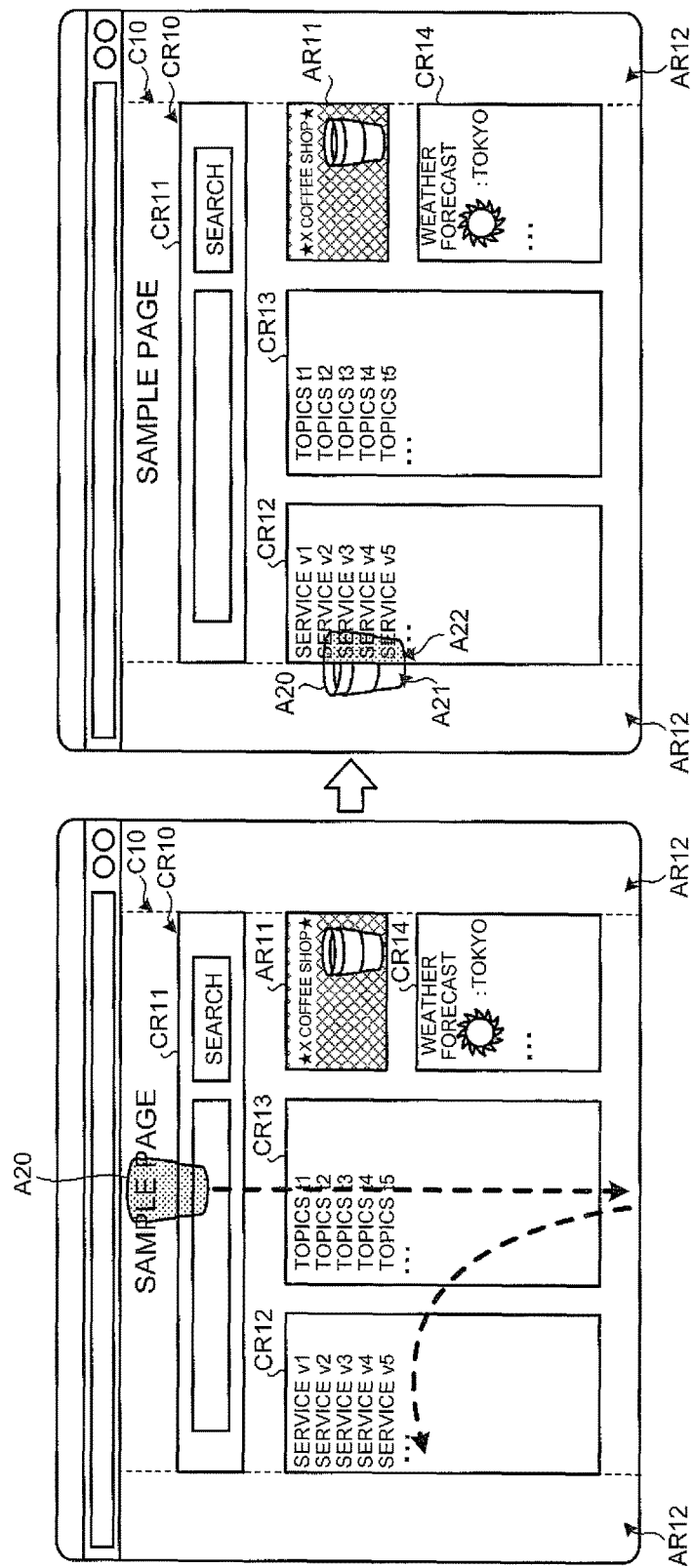
FIG. 12 is a diagram illustrating an example of an advertisement displaying process according to a modification.

In the above-described embodiment, the terminal apparatus 10 may move the advertising content and then display the advertising content so as to partially overlap the webpage. This will be described with reference to FIG. 12. FIG. 12 is a diagram illustrating an example of an advertisement displaying process according to a modification.

As illustrated on the left side of FIG. 12, the terminal apparatus 10 displays the advertising content A20 on the upper end of the webpage C10 when the webpage C10 is displayed first. After that, the terminal apparatus 10 moves the advertising content A20 to the lower end of the webpage C10 and then moves the advertising content A20 to the center of the left side of the webpage C10. That is, the terminal apparatus 10 moves the advertising content A20 so as to bounce from the lower end of the webpage C10. The terminal apparatus 10 changes the clickable region and the non-clickable region of the advertising content A20 while moving the advertising content A20 in this manner. In the example of FIG. 12, the terminal apparatus 10 displays the advertising content A20 as a shadow until a portion of the advertising content A20 reaches the non-use region AR12. When a portion of the advertising content A20 reaches the non-use region AR12, the terminal apparatus 10 displays the region A21 of the advertising content A20 overlapping the non-use region AR12 in a clickable state and displays the region A22 of the advertising content A20 that does not overlap the non-use region AR12 as a shadow in a non-clickable state.

In this manner, since the terminal apparatus 10 changes the clickable region and the non-clickable region with the movement of the advertising content A20 similarly to the example of FIG. 11, the terminal apparatus 10 can improve the advertising effect of the advertising content A20. In the example of FIG. 12, the terminal apparatus 10 may display only the webpage C10 in an initial screen and start displaying the advertising content A20 after elapse of a predetermined period (for example, 1 or 2 seconds). In this way, when a processing load for displaying the screen on the right side of FIG. 12 from the start is high, the terminal apparatus 10 may display the webpage C10 only at the start. Due to this, the terminal apparatus 10 may prevent a delay in the response time until the webpage C10 is displayed.

In the example of FIG. 12, the distributing unit 132 of the distribution apparatus 100 distributes the webpage C10 including the control information for realizing the display mode illustrated in FIG. 12 to the terminal apparatus 10. For example, the distributing unit 132 distributes the control information for controlling a process of moving the advertising content A20 and a process of changing the clickable region and the non-clickable region of the advertising content A20.

In the example of FIG. 12, the terminal apparatus 10 may move the advertising content A20 when the advertising content A20 is mouse-overed, for example, similarly to the example of FIG. 11. As illustrated in FIG. 12, the terminal apparatus 10 may display general advertising content in the advertisement display region AR11. For example, the terminal apparatus 10 may display the advertising content provided by the advertiser of the advertising content A20 in the advertisement display region AR11.

9-3. Display Position of Advertising Content

Figure 13:
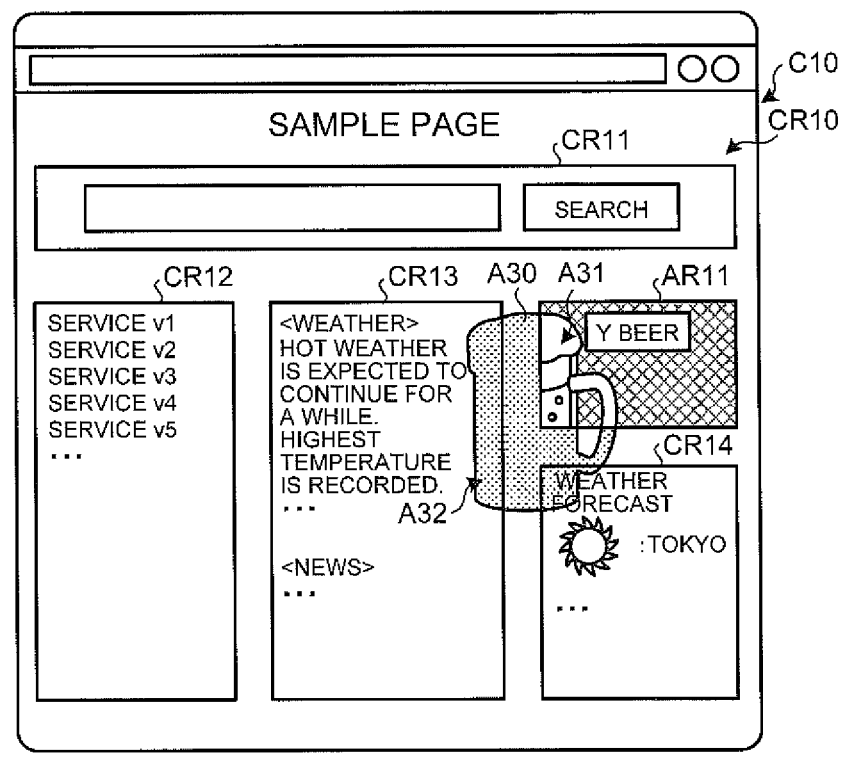
FIG. 13 is a diagram illustrating an example of an advertisement displaying process according to a modification.

In the above-described embodiment, the terminal apparatus 10 may determine a display position of advertising content based on correlation between display information of a webpage and the advertising content. This will be described with reference to FIG. 13. FIG. 13 is a diagram illustrating an example of an advertisement displaying process according to a modification.

An article related to "hot weather" is posted in the content display region CR13 of the webpage C10 illustrated in FIG. 13. Moreover, the terminal apparatus 10 receives advertising content A30 related to "beer" from the advertising apparatus 30. Moreover, the terminal apparatus 10 receives advertising content displayed in the advertisement display region AR11 from the advertising apparatus 30. In the example of FIG. 13, the terminal apparatus 10 receives a still image in which "Y beer" or the like is described as the advertising content displayed.

As illustrated in FIG. 13, the terminal apparatus 10 determines that "hot weather" and "beer" are related and displays the advertising content A30 near the position at which an article related to "hot weather" is posted. In this case, the terminal apparatus 10 displays a region A31 of the advertising content A30 that does not overlap the content display region CR10 in a clickable state. Moreover, the terminal apparatus 10 displays a region A32 of the advertising content A30 overlapping the content display region CR10 as a shadow in a non-clickable state.

In this manner, since the terminal apparatus 10 displays the advertising content A30 near the position at which information related to the advertising content A30 is displayed, the terminal apparatus 10 can display advertisements so as to be interlocked with the display information of the webpage C10. In this way, the terminal apparatus 10 can improve the advertising effect of the advertising content A30.

In the example of FIG. 13, the distributing unit 37 of the advertising apparatus 30 distributes the advertising content A30 including the type of the advertising content A30 to the terminal apparatus 10, for example. As an example, the distributing unit 37 sets the type (for example, "beverage," "beer," or the like) of the advertising content A30 to the metadata of the advertising content A30 which is a still image or a moving image.

The distributing unit 132 of the distribution apparatus 100 distributes the webpage C10 including the control information for realizing the display mode illustrated in FIG. 13 to the terminal apparatus 10. Specifically, the distributing unit 132 distributes the control information for controlling a process of analyzing the display information of the webpage C10, a process of determining the correlation between the display information of the webpage C10 and the type of the advertising content A30, a process of determining the display position of the advertising content A30 based on a determination result on correlation, and other processes. For example, the control information includes correspondence information that correlates keywords displayed in the webpage C10 with the type of advertising content related to each keyword. The control information determines whether a combination of a keyword obtained from the display information of the webpage C10 and the type of the advertising content A30 is included in the correspondence information to thereby perform a process of determining the correlation.

The correlation determining process may be performed by the distribution apparatus 100 rather than by the control information. In this case, the distribution apparatus 100 stores the above-described correspondence information. The terminal apparatus 10 of FIG. 13 asks the distribution apparatus 100 of the display position of the advertising content A30 when displaying the webpage C10 and the advertising content A30 according to the control information. In this case, the terminal apparatus 10 transmits the type of the advertising content A30 to the distribution apparatus 100. The distribution apparatus 100 determines the display position of the advertising content A30 based on the correspondence information and the type of the advertising content A30 and sends the determined display position to the terminal apparatus 10. Moreover, the terminal apparatus 10 displays the display position sent from the distribution apparatus 100 on the advertising content A30.

In the example of FIG. 13, the extracting unit 36 of the advertising apparatus 30 preferentially extracts advertising content related to the display information of the webpage C10. For example, the terminal apparatus 10 transmits keywords and the like displayed in the webpage C10 to the advertising apparatus 30 together with the advertising content acquisition request. Moreover, the extracting unit 36 of the advertising apparatus 30 preferentially extracts advertising content related to the keyword received from the terminal apparatus 10. In this way, the distributing unit 37 of the advertising apparatus 30 distributes the advertising content extracted by the extracting unit 36 to the terminal apparatus 10. The terminal apparatus 10 displays the advertising content received from the advertising apparatus 30 similarly to the example illustrated in FIG. 13. The embodiment is not limited to this example, but the extracting unit 36 of the advertising apparatus 30 may preferentially extract advertising content matching a retrieval keyword that a user designates in a retrieval engine and may preferentially extract advertising content matching attribute information (psychographic attribute, demographic attribute, or the like) of the user.

Moreover, the process of determining the display position of the advertising content is not limited to the example of FIG. 13. For example, it is assumed that the terminal apparatus 10 displays a webpage related to a route search site. In this case, the terminal apparatus 10 displays a webpage corresponding to a route retrieval result after the input of a departure station and an arrival station is received from a user. In this case, the terminal apparatus 10 may display advertising content (advertising content or the like related to items sold in a location corresponding to the arrival station) related to an arrival station near a position at which the arrival station is displayed in the route retrieval result, for example. In this example, the extracting unit 36 of the advertising apparatus 30 may preferentially extract advertising content related to display information (for example, an arrival station or the like) of the route retrieval result.

9-4. Change in Advertising Content

Figure 14:
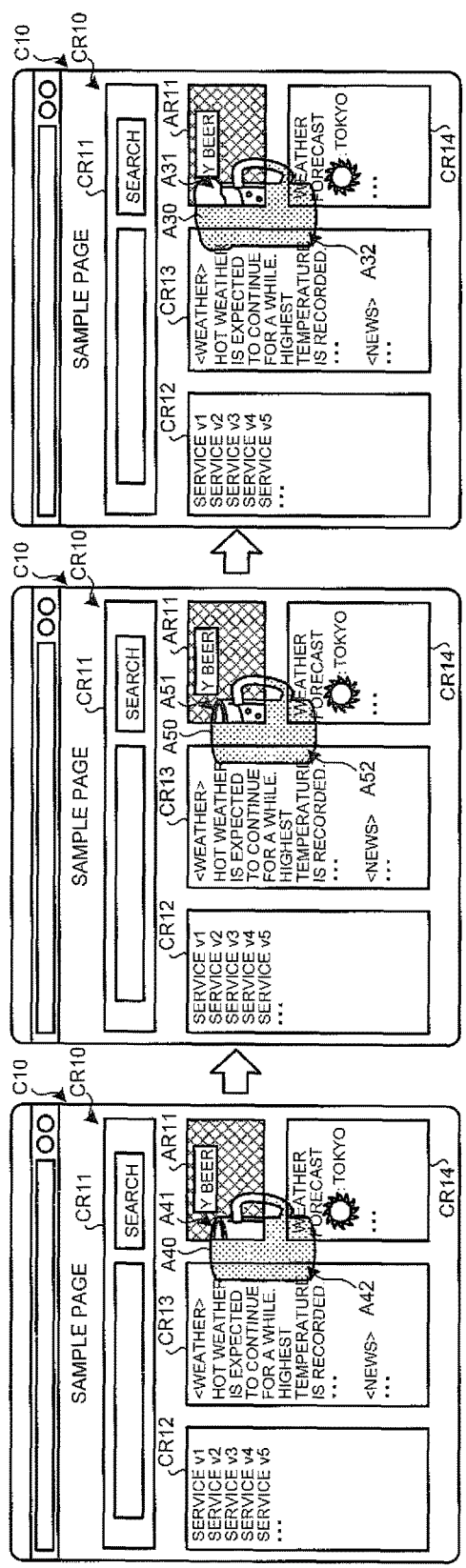
FIG. 14 is a diagram illustrating an example of an advertisement displaying process according to a modification.

In the above-described embodiment, the terminal apparatus 10 may display advertising content of which the display mode changes dynamically with time. This will be described with reference to FIG. 14. FIG. 14 is a diagram illustrating an example of an advertisement displaying process according to a modification.

As illustrated on the left side of FIG. 14, the terminal apparatus 10 first displays advertising content A40 related to "mug". In this case, the terminal apparatus 10 displays a region A41 which is a clickable region of the advertising content A40 in a clickable state and displays a region A42 which is a non-clickable region of the advertising content A40 as a shadow in a non-clickable state.

Subsequently, the terminal apparatus 10 sequentially displays advertising content illustrating the states in which the "mug" is gradually filled with beer. For example, in the state illustrated at the center of FIG. 14, the terminal apparatus 10 displays advertising content A50 illustrating a state where approximately 80% of the "mug" is filled with beer. In this case, the terminal apparatus 10 displays a region A51 which is a clickable region of the advertising content A50 in a clickable state and displays a region A52 which is a non-clickable region of the advertising content A50 as a shadow in a non-clickable state. As illustrated on the right side of FIG. 14, the terminal apparatus 10 displays advertising content A30 illustrating a state where the "mug" is finally filled with beer to the top. That is, in the example of FIG. 14, the terminal apparatus 10 displays advertising content that changes in the order of advertising content A40, A50, and A30. The advertising content A40, A50, and A30 may be frames included in one moving image and may be different still images.

In this manner, the terminal apparatus 10 may change display target advertising content with time. The terminal apparatus 10 may change the clickable region and the non-clickable region whenever new advertising content is displayed. In this way, since the terminal apparatus 10 can allow the advertising content to be noticed by users, it is possible to improve the advertising effect of the advertising content.

In the example of FIG. 14, the submission receiving unit 34 of the advertising apparatus 30 receives advertising content (for example, a moving image) displayed in the webpage C10 from the advertiser terminal 20. For example, the submission receiving unit 34 causes the advertiser to select whether the advertising content is to be displayed in the display mode illustrated in FIG. 14. When the display mode illustrated in FIG. 14 is selected, the submission receiving unit 34 receives a submission of advertising content which are moving images. The distributing unit 37 of the advertising apparatus 30 and the distributing unit 132 of the distribution apparatus 100 distribute a webpage C10 including control information for realizing the display mode illustrated in FIG. 14 to the terminal apparatus 10. The control information controls a process of changing the clickable region and the non-clickable region of the advertising content according to the display mode of the advertising content.

The embodiment is not limited to the above example, but the submission receiving unit 34 of the advertising apparatus 30 may receive a plurality of advertising contents sequentially displayed in the webpage C10 from the advertiser terminal 20. For example, when the display mode illustrated in FIG. 14 is selected, the submission receiving unit 34 causes the advertiser to designate a display order and receives a submission of advertising content. The distributing unit 37 of the advertising apparatus 30 distributes the advertising content to the terminal apparatus 10 together with display order information indicating the display order of the advertising content. Moreover, the distributing unit 132 of the distribution apparatus 100 distributes a webpage C10 including control information for displaying the advertising content in the display mode illustrated in FIG. 14 to the terminal apparatus 10. The control information controls so that the advertising content received from the advertising apparatus 30 are sequentially displayed based on the display order information.

In the example of FIG. 14, when displaying the advertising content in the final display mode (the advertising content A30 illustrated in FIG. 14), the terminal apparatus 10 may display the entire advertising content A30 in a clickable state. That is, in the example on the right side of FIG. 14, the terminal apparatus 10 may display a region A32 of the advertising content A30 in a clickable state. In this case, the terminal apparatus 10 may display an image itself corresponding to the region A32 rather than displaying the region A32 of the advertising content A30 as a shadow.

For example, a period elapsed until the final advertising content A30 is displayed after the advertising content A40 is displayed is set to be longer than a normal browsing period of the user browsing the webpage C10. In this case, it is considered that the user focuses on the advertising content of which the display mode changes rather than focusing on the webpage C10. Thus, the terminal apparatus 10 displays the entire advertising content A30 over the webpage C10 in a clickable state, whereby the user focusing on the advertising content can browse the advertising content A30. As a result, the terminal apparatus 10 can improve the advertising effect of the advertising content A30.

In the example illustrated in FIG. 14, the terminal apparatus 10 may continuously display the advertising content A40 and display other advertising content sequentially when a user performs a predetermined operation. For example, the terminal apparatus 10 may sequentially display other advertising content when advertising content is mouse-overed. In this case, once advertising content is mouse-overed, the terminal apparatus 10 may sequentially display other advertising content even if advertising content is not mouse-overed after that. Alternatively, the terminal apparatus 10 may sequentially display other advertising content only when advertising content is mouse-overed. In this way, since the terminal apparatus 10 changes the advertising content only when the user focuses on advertising content, it is possible to prevent an unsightly advertisement from being displayed to users.

9-5. User Confirmation of Click

Figure 15:
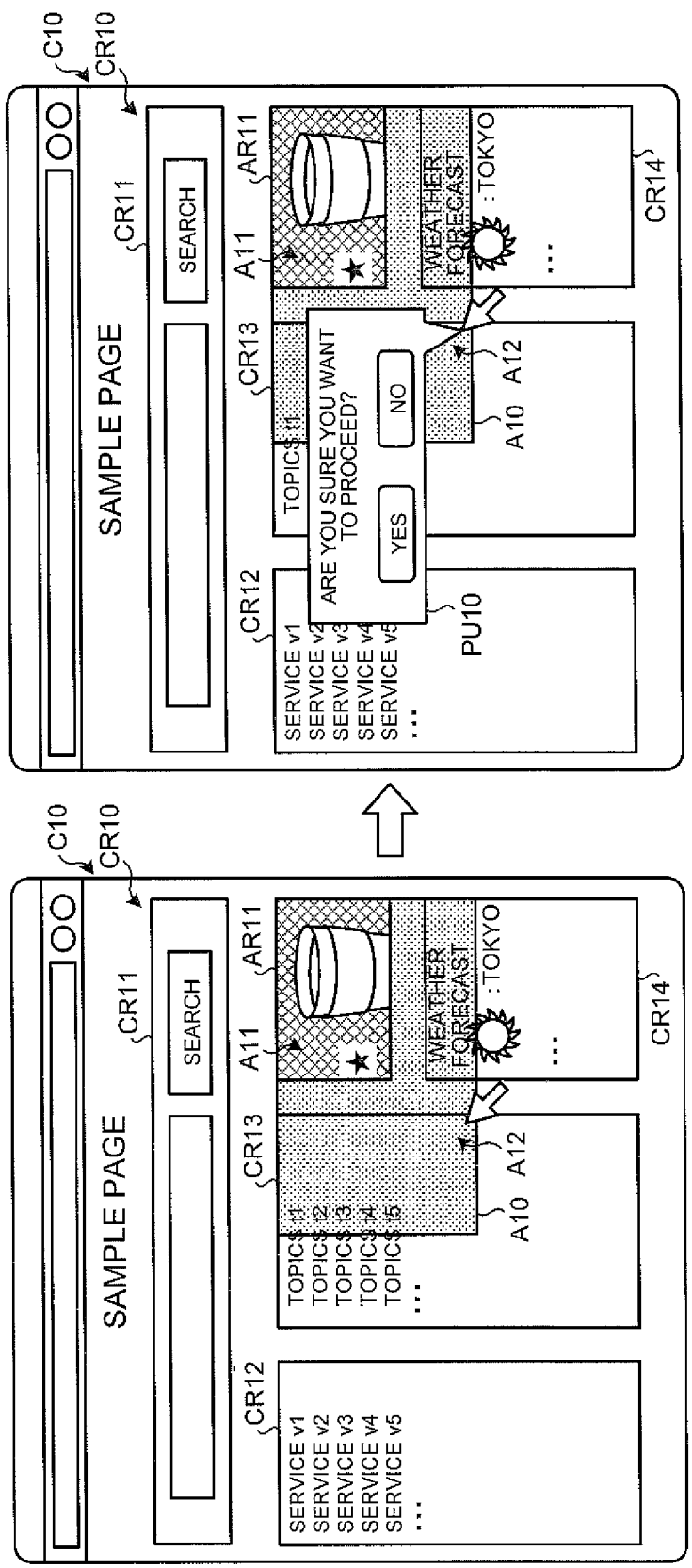
FIG. 15 is a diagram illustrating an example of an advertisement displaying process according to a modification.

In the above-described embodiment, when a non-clickable region of advertising content is clicked on, the terminal apparatus 10 may cause a user to select whether the user wants to click on the advertising content. This will be described with reference to FIG. 15. FIG. 15 is a diagram illustrating an example of an advertisement displaying process according to a modification.

As illustrated on the left side of FIG. 15, the terminal apparatus 10 displays advertising content A10 similarly to the example illustrated in FIG. 1. In this example, when the region A12 which is a non-clickable region of the advertising content A10 is clicked on, the terminal apparatus 10 displays a popup screen PU10 for allowing a user to select whether the user wants to proceed to an advertisement page as illustrated on the right side of FIG. 15. Specifically, when a portion of the region A12 of the advertising content A10 that does not overlap the link region of the webpage C10 is clicked on, the terminal apparatus 10 displays the popup screen PU10. When the user selects to proceed to the advertisement page in the popup screen PU10, the terminal apparatus 10 accesses the advertisement page which is a link destination of the advertising content A10. On the other hand, when the user does not select to proceed to the advertisement page, the terminal apparatus 10 closes the popup screen PU10 and displays the webpage C10 and the advertising content A10 similarly to the example illustrated on the left side of FIG. 15.

In this manner, when the non-clickable region of the advertising content A10 is clicked on, the terminal apparatus 10 asks the user about whether it is necessary to proceed to the advertisement page. In this way, even when the non-clickable region is clicked on, the terminal apparatus 10 can display the advertisement page according to the user's intention. As a result, the terminal apparatus 10 can improve the advertising effect of the advertising content A10 and improve usability.

In the example of FIG. 15, the distributing unit 132 of the distribution apparatus 100 distributes the webpage C10 including the control information for realizing the display mode illustrated in FIG. 15 to the terminal apparatus 10. For example, when the non-clickable region of the advertising content A10 is clicked on, the distributing unit 132 distributes the control information for controlling a process of displaying the popup screen PU10.

9-6. Fixed Display of Advertising Content

Figure 16:
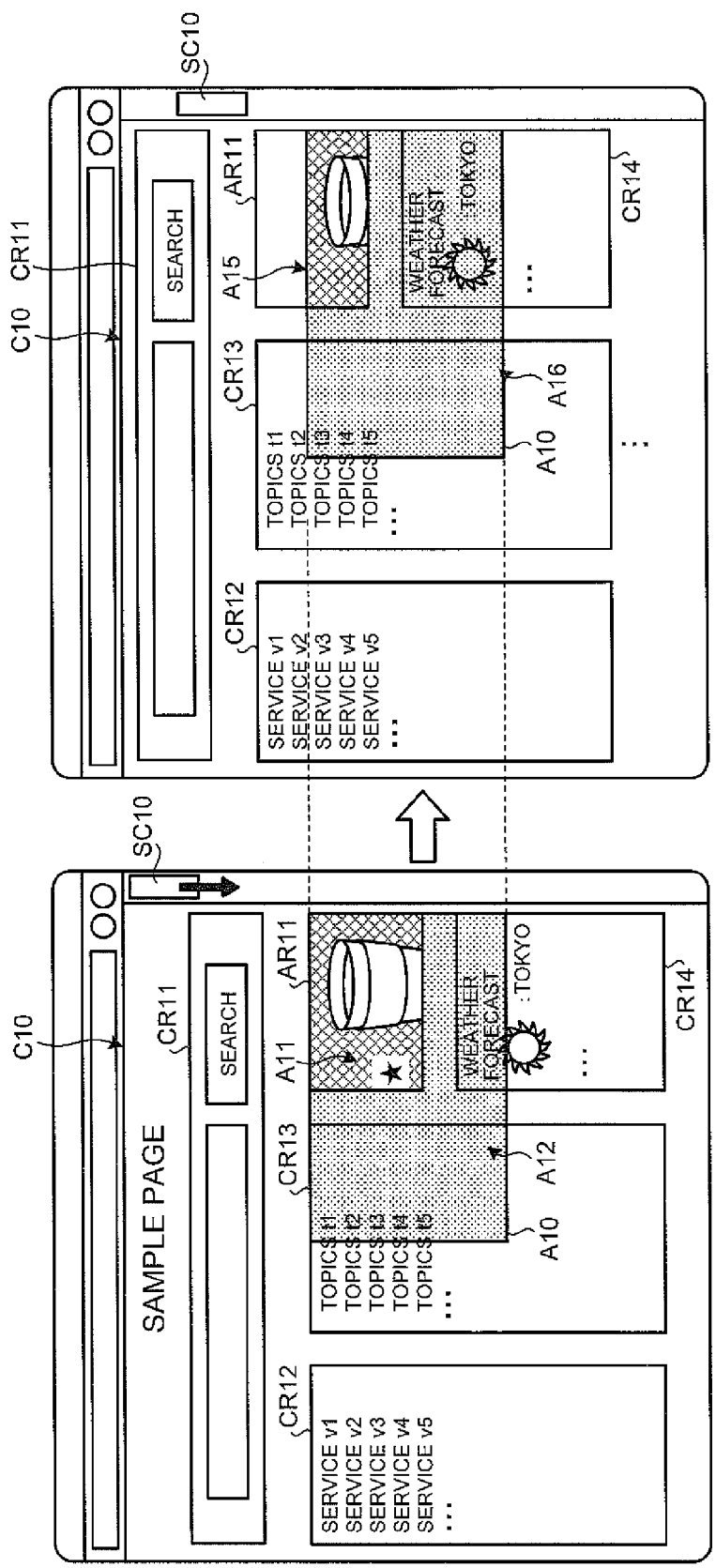
FIG. 16 is a diagram illustrating an example of an advertisement displaying process according to a modification.
Figure 17:
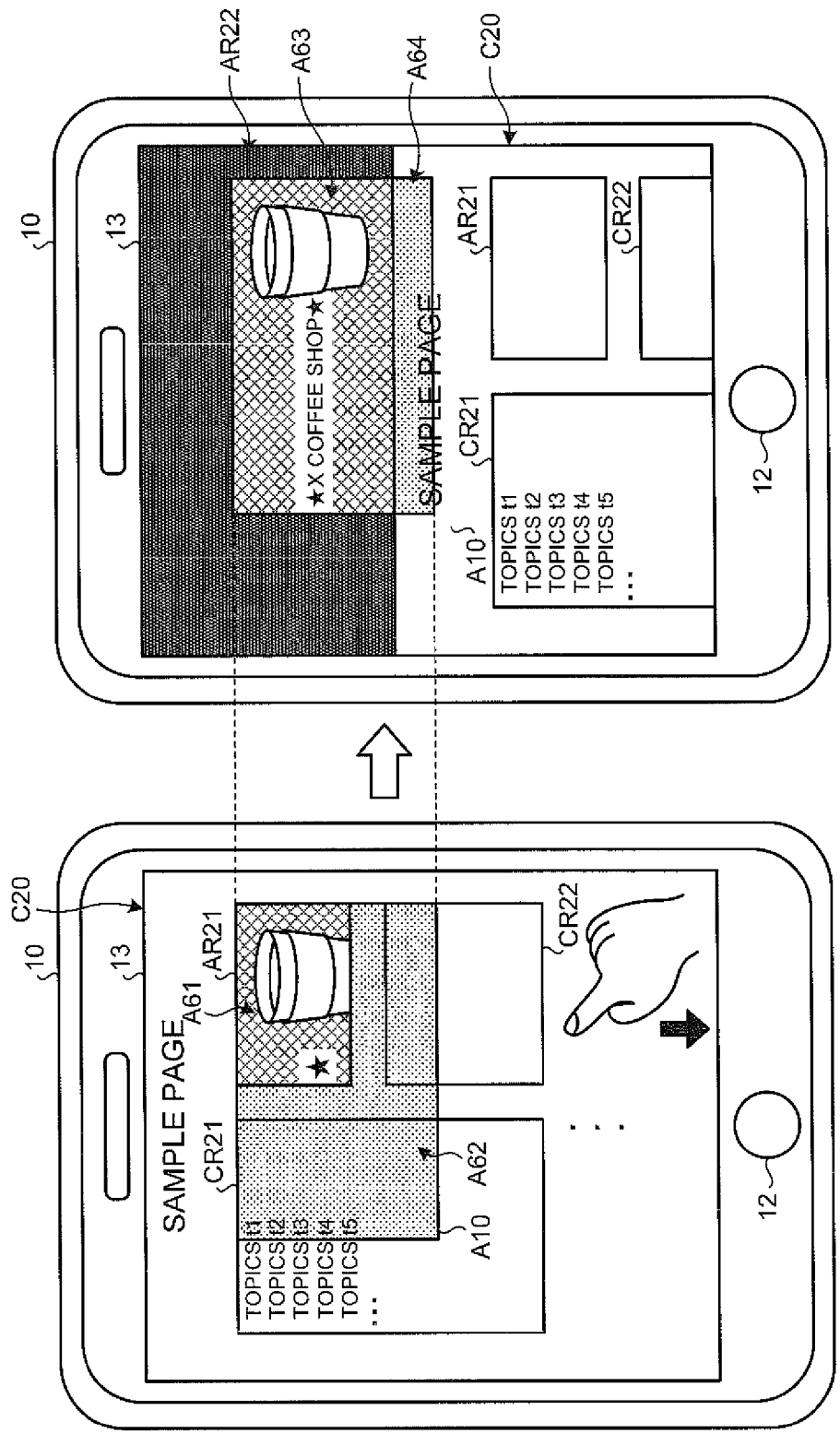
FIG. 17 is a diagram illustrating an example of an advertisement displaying process according to a modification.

In the above-described embodiment, the terminal apparatus 10 may display the advertising content at a fixed position without displaying the same so as to be interlocked with a change in the display position in the webpage. This will be described with reference to FIGS. 16 and 17. FIGS. 16 and 17 are diagrams illustrating an example of an advertisement displaying process according to a modification.

As illustrated on the left side of FIG. 16, the terminal apparatus 10 displays the advertising content A10 similarly to the example illustrated in FIG. 1. Here, it is assumed that the terminal apparatus 10 cannot display the webpage C10 illustrated in FIG. 16 in one screen. In this case, the terminal apparatus 10 displays a scroll bar SC10 as illustrated on the left side of FIG. 16.

As illustrated on the right side of FIG. 16, the terminal apparatus 10 changes the display position of the webpage C10 in response to the user moving the scroll bar SC10. On the other hand, the terminal apparatus 10 does not change the display position of the advertising content A10 from the state on the left side of FIG. 16. In this case, since the display position of the webpage C10 is changed, the display position of the advertising content A10 in relation to the webpage C10 changes. Due to this, the terminal apparatus 10 changes the clickable region and the non-clickable region of the advertising content A10 according to a change in the display position of the webpage C10. Specifically, the terminal apparatus 10 changes the clickable region of the advertising content A10 from the region A11 to the region A15 and changes the non-clickable region of the advertising content A10 from the region A12 to the region A16. Even when the advertising content A10 is not displayed in a portion of the advertisement display region AR11, the terminal apparatus 10 displays the entire advertisement display region AR11 in a clickable state. That is, even when a portion of the advertisement display region AR11 in which the advertising content A10 is not displayed is clicked on, the terminal apparatus 10 receives the user's operation by determining that the advertising content A10 is clicked on.

In this manner, since the terminal apparatus 10 displays the advertising content A10 at a fixed position regardless of the display position of the webpage C10, the terminal apparatus 10 can display the advertising content A10 so as to give a strong impression to users. As a result, the terminal apparatus 10 can improve the advertising effect of the advertising content A10.

In the example of FIG. 16, the distributing unit 132 of the distribution apparatus 100 distributes the webpage C10 including the control information for realizing the display mode illustrated in FIG. 16 to the terminal apparatus 10. For example, the distributing unit 132 distributes the control information for controlling a process of displaying the advertising content A10 at a fixed position, a process of changing the clickable region and the non-clickable region of the advertising content A10 with a change in the relative display position of the advertising content A10 in relation to the webpage C10, and other process.

Next, the example of FIG. 17 will be described. In the example of FIG. 17, it is assumed that the terminal apparatus 10 is a tablet terminal. As illustrated on the left side of FIG. 17, the terminal apparatus 10 displays a webpage C20 on the entire output unit 13 and displays the advertising content A10 so as to overlap the webpage C20. The webpage C20 includes content display regions CR21 and CR22 and an advertisement display region AR21. A region of the webpage C20 other than the advertisement display region AR21 corresponds to a content display region. In this case, the terminal apparatus 10 displays a region A61 of the advertising content A10 overlapping the advertisement display region AR21 in a clickable state. Moreover, the terminal apparatus 10 displays a region A62 of the advertising content A10 that does not overlap the advertisement display region AR21 as a shadow in a non-clickable state.

Here, the terminal apparatus 10 such as a tablet terminal may receive an operation of moving the webpage C20 in a direction where the webpage C20 is not displayed in a display region of the output unit 13. For example, in the example on the left side of FIG. 17, even when an upper end region of the webpage C20 is displayed on the output unit 13, the terminal apparatus 10 may receive an operation of moving the webpage C20 in a downward direction. In this case, as illustrated on the right side of FIG. 17, the terminal apparatus 10 displays a black background or the like indicating that display target content is not present in the upper portion of the webpage C20. This black background corresponds to a non-use region AR22 in which the webpage C20 is not displayed.

In the example on the right side of FIG. 17, when the display position of the webpage C20 is changed, the terminal apparatus 10 does not change the display position of the advertising content A10 from the state on the left side of FIG. 17. In this case, since the display position of the webpage C20 is changed, the display position of the advertising content A10 in relation to the webpage C20 changes. Due to this, the terminal apparatus 10 displays a region A63 of the advertising content A10 overlapping the non-use region AR22 in a clickable state. Moreover, the terminal apparatus 10 displays a region A64 of the advertising content A10 that does not overlap the non-use region AR22 in a non-clickable state.

In this manner, since the terminal apparatus 10 displays the advertising content A10 in a non-use region AR22 formed according to an operation of moving the webpage C20 in a clickable state, the terminal apparatus 10 can effectively utilize the display region of the output unit 13 for displaying advertisements. Moreover, since the terminal apparatus 10 can display new advertisements by displaying the advertising content A10 in the non-use region AR22 formed according to the operation of moving the webpage C20, it is possible to display the advertising content A10 so as to give a strong impression to the user. As a result, it is possible to improve the advertising effect of the advertising content A10.

In the example of FIG. 17, the distributing unit 132 of the distribution apparatus 100 distributes the webpage C20 including the control information for realizing the display mode illustrated in FIG. 17 to the terminal apparatus 10. For example, the distributing unit 132 distributes the control information for controlling a process of displaying the advertising content A10 at a fixed position, a process of changing the clickable region and the non-clickable region of the advertising content A10 according to a change in the relative display position of the advertising content A10 in relation to the webpage C20, and other processes.

9-7. Selection of Webpage

Figure 18:
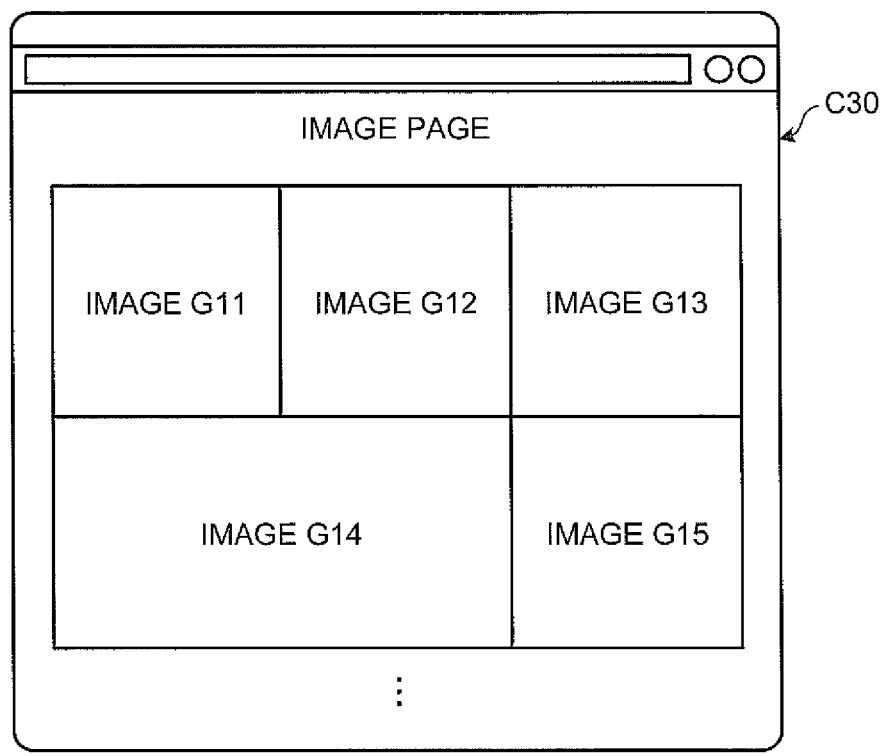
FIG. 18 is a diagram illustrating an example of an advertisement displaying process according to a modification.

In the above-described embodiment, the terminal apparatus 10 may determine whether the webpage and the advertising content so as to overlap depending on the type of the webpage. This will be described with reference to FIG. 18. FIG. 18 is a diagram illustrating an example of an advertisement displaying process according to a modification.

A webpage C30 illustrated in FIG. 18 corresponds to an image retrieval result screen, for example, in which images G11 to G15 are displayed with no gap. When the advertising content is displayed so as to overlap such a webpage C30, a display mode in which both the webpage C30 and the advertising content is difficult to see may be created. This will be described in detail with comparison with the example illustrated in FIG. 1. For example, a gap in which characters or images are not displayed is present in the content display region CR10 of the webpage C10 illustrated in FIG. 1. Due to this, even when the content display region CR10 and the advertising content A10 are displayed so as to overlap, a portion in which characters or images displayed in the webpage C10 do not overlap is present in the region A12 of the advertising content A10 displayed as a shadow. That is, in the example of FIG. 1, since a region displayed as a shadow is present, it is less likely that both the webpage C10 and the advertising content A10 are difficult to see. On the other hand, images or the like are displayed without any gap in the webpage C30 illustrated in FIG. 18. Due to this, when the webpage C30 and the advertising content is displayed so as to overlap, the advertising content displayed as a shadow generally overlaps the image displayed in the webpage C30. That is, in the example of FIG. 18, it tends to be difficult to see both the webpage C30 and the advertising content. Thus, the terminal apparatus 10 may not perform a process of displaying the advertising content so as to overlap the webpage in which the advertising content is displayed in a narrow gap as the webpage C30 illustrated in FIG. 18.

Here, whether a gap for displaying the advertising content is present in the webpage can be determined based on the type of the webpage. For example, in a webpage in which news articles or the like are displayed, characters are rarely displayed without any gap, and a gap for displaying advertising content tends to be present. In the example of FIG. 18, in a webpage in which image retrieval results are displayed, images are often displayed without any gap, and the gap for displaying advertising content tends to be narrow. Due to this, the terminal apparatus 10 can determine whether the webpage and the advertising content are to be displayed so as to overlap depending on the type of the webpage. When the type of the webpage is "news page" or the like, for example, the terminal apparatus 10 performs a process of displaying the webpage and the advertising content so as to overlap similarly to the example illustrated in FIG. 1. Moreover, when the type of the webpage is "image retrieval result" or the like, for example, the terminal apparatus 10 does not perform a process of displaying the webpage and the advertising content so as to overlap.

In this manner, since the terminal apparatus 10 selects a webpage that is suitable for displaying the advertising content so as to overlap, the terminal apparatus 10 can prevent the webpage and the advertising content from being difficult to see.

The embodiment is not limited to the above example, but the terminal apparatus 10 may determine whether the webpage and the advertising content is to be displayed so as to overlap based on a browsing period of a webpage by general users. For example, a webpage in which a list of links to other webpages is displayed is generally browsed until the users discover an intended link destination. Due to this, the period in which a user browses a webpage of a list of links or the like tends to be short. On the other hand, a webpage in which news articles or the like are displayed is browsed until a user reads through a news article. Due to this, the period in which a user browses a webpage of news articles or the like tends to be long. That is, even when advertising content is displayed in a webpage of a list of links or the like, the advertising content may not be noticed by users. Due to this, the terminal apparatus 10 performs a process of displaying the webpage and the advertising content so as to overlap as in the example illustrated in FIG. 1 when the type of the webpage is "news page" or the like and does not perform a process of displaying the webpage and the advertising content so as to overlap when the type of the webpage is "link site" or the like.

In the example of FIG. 18, the distributing unit 132 of the distribution apparatus 100 distributes the control information for determining whether a webpage and advertising content are to be displayed so as to overlap to the terminal apparatus 10. For example, the control information includes display presence or absence information indicating whether a webpage and advertising content are to be displayed so as to overlap for each type of the webpage. The control information acquires the type of the webpage by analyzing an HTML file or the like that forms a webpage. Alternatively, the control information acquires the type of the webpage described in an HTML file or the like that forms a webpage. Moreover, the control information determines whether the webpage and the advertising content are to be displayed so as to overlap based on the type of the webpage and the display presence or absence information.

The process of determining whether the webpage and the advertising content are to be displayed so as to overlap may be performed by the distribution apparatus 100 rather than the control information. In this case, the distribution apparatus 100 includes the above-described display presence or absence information. The distributing unit 132 of the distribution apparatus 100 determines whether the webpage and the advertising content are to be displayed so as to overlap based on the type of a distribution target webpage and the display presence or absence information. When it is determined that the webpage and the advertising content are to be displayed so as to overlap, the distributing unit 132 distributes a webpage including the control information for realizing the display mode illustrated in FIG. 1 or the like to the terminal apparatus 10. On the other hand, when it is determined that the webpage and the advertising content are not to be displayed so as to overlap, the distributing unit 132 distributes a webpage that does not include the control information for realizing the display mode illustrated in FIG. 1 or the like to the terminal apparatus 10. That is, the distributing unit 132 may dynamically change the control information included in the webpage according to the type of the webpage.

9-8. Submission of Advertising Content

In the above-described embodiment, the submission receiving unit 34 of the advertising apparatus 30 may allow the advertiser to select the display mode of the advertising content. Specifically, the submission receiving unit 34 may allow the advertiser to select a desired display mode among a portion of or all display modes of advertising content illustrated in FIGS. 1, 7, 8, 11, 12, 13, 14, 15, 16, and 17. In this case, the submission receiving unit 34 may allow a general advertising content display mode in which the entire advertising content is displayed in an advertisement display region to be selected.

The submission receiving unit 34 may allow the advertiser to designate a detailed advertising content display mode according to the display mode selected by the advertiser. For example, the submission receiving unit 34 may allow the advertiser to designate the clickable region and the non-clickable region of the advertising content when the display mode illustrated in FIG. 1, 7, 8, 14, 15, 16, or 17 is selected. Moreover, for example, the submission receiving unit 34 may allow the advertiser to designate a moving path or a moving speed of the advertising content when the display mode illustrated in FIG. 11 or 12 is selected.

When the advertiser has designated a detailed advertising content display mode, the submission receiving unit 34 stores various types of designation information (for example, information on the clickable region and the non-clickable region, information on the moving path, and information on the moving speed) in the advertisement content storage unit 32. The distributing unit 37 of the advertising apparatus 30 distributes various types of designation information to the terminal apparatus 10 together with the advertising content. Moreover, the terminal apparatus 10 displays the advertising content based on various types of designation information transmitted by the advertising apparatus 30. That is, the control information included in the webpage controls the advertising content display mode based on various types of designation information.

9-9. Apparatus Configuration

In the above-described embodiment, although an example in which the advertising apparatus 30 and the distribution apparatus 100 are included in the advertisement distribution system 1 has been illustrated, the advertising apparatus 30 and the distribution apparatus 100 may be formed as one apparatus. In this case, the distribution apparatus 100 illustrated in FIG. 5 includes the advertisement content storage unit 32, the submission receiving unit 34, and the extracting unit 36 illustrated in FIG. 3, for example. When a webpage acquisition request is received from the terminal apparatus 10, the distribution apparatus 100 distributes a webpage that does not include the advertisement acquisition command to the terminal apparatus 10 together with the advertising content extracted from the advertisement content storage unit 32.

In the above-described embodiment, although an example in which advertising content is distributed from the advertising apparatus 30 to the terminal apparatus 10 has been illustrated, the distribution apparatus 100 may acquire the advertising content from the advertising apparatus 30. In this case, the request receiving unit 35 of the advertising apparatus 30 receives the advertising content acquisition request from the distribution apparatus 100. Moreover, the distributing unit 37 of the advertising apparatus 30 distributes the advertising content to the distribution apparatus 100. Further, the distributing unit 132 of the distribution apparatus 100 distributes a webpage that does not include the advertisement acquisition command to the terminal apparatus 10 together with the advertising content acquired from the advertising apparatus 30.

9-10. Others

In the above-described embodiment, although an example in which the non-clickable region of advertising content is displayed as a shadow has been illustrated, the terminal apparatus 10 may set a predetermined level of transparency to the non-clickable region of the advertising content and display the same so as to overlap a webpage. For example, the terminal apparatus 10 displays the non-clickable region of the advertising content in a more transparent state than the webpage. In this case, the terminal apparatus 10 may display the non-clickable region of the advertising content in a smaller contrast state than the webpage and may display the non-clickable region of the advertising content in a smaller light and shade difference than the webpage. In this case, the terminal apparatus 10 can display the non-clickable region of the advertising content in a state where both the webpage and the advertising content can be viewed by the user.

In the above-described embodiment, although a user operation of selecting advertising content or a link region of a webpage is referred to as "click," the user operation is not limited to a click operation using a mouse. For example, the "click" may be an operation of tapping advertising content or the like with a finger and may be an operation of selecting advertising content or the like with the eye movement.

In the above-described embodiment, the terminal apparatus 10 may display a button for removing a shadow in a region of the advertising content displayed in a clickable state. For example, in the example of FIG. 1, the terminal apparatus 10 displays a button for removing a shadow in the region A11 of the advertising content A10. When the user clicks on the button, the terminal apparatus 10 removes the region A12 of the advertising content A10. By doing so, the terminal apparatus 10 can allow the user to dynamically select the advertising content display mode.

In the above-described embodiment, although an example in which advertising content is displayed so as to overlap a webpage has been illustrated, the content displayed so as to overlap the advertising content is not limited to the webpage. For example, the advertising content may be displayed on a screen of a mobile phone game or the like.

In the above-described embodiment, although the advertising content has been described by way of an example, the content displayed in the webpage is not limited to advertising content for advertisement. For example, the advertising content may be content for informing weather information, earthquake information, or the like.

All or part of the processes described as being automatically performed among the processes described in the above embodiments may be performed manually. Alternatively, all or part of the processes described as being performed manually may be performed automatically according to an existing method. Moreover, the information including the processing sequence, specific names, various types of data and parameters illustrated in the document and drawings can be changed optionally unless stated explicitly. For example, the various types of information illustrated in the respective drawings are not limited to the illustrated information.

Moreover, the respective constituent components of the respective illustrated devices are conceptual for describing functions and do not need to be physically configured as depicted in the drawings. That is, concrete forms of distribution and integration of the respective devices are not limited to those depicted in the drawings, and all or part of the devices can be configured to be functionally or physically distributed and integrated in optional units depending on various load and use conditions. For example, the requesting unit 15 and the receiving unit 16 illustrated in FIG. 6 may be integrated.

The above-described embodiments can be appropriately combined within such a range that processing content does not conflict with each other. For example, the embodiment illustrated in FIG. 11 may be combined with the embodiment illustrated in FIG. 15. In this case, the terminal apparatus 10 displays the popup screen PU10 illustrated in FIG. 15 when the non-clickable region of the advertising content A10 or A20 illustrated in FIG. 11 is clicked on.

9-11. Hardware Configuration

Figure 19:
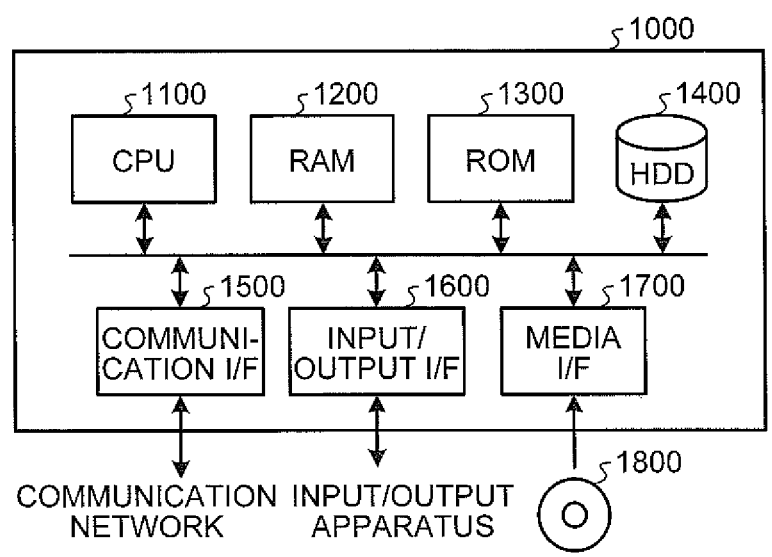
FIG. 19 is a diagram illustrating a hardware configuration illustrating an example of a computer that realizes the functions of a distribution apparatus.

The terminal apparatus 10 and the distribution apparatus 100 according to the above-described embodiment are realized by a computer 1000 having such a configuration as illustrated in FIG. 19, for example. Hereinafter, the distribution apparatus 100 will be described as an example. FIG. 19 is a diagram illustrating a hardware configuration illustrating an example of the computer 1000 that realizes the functions of the distribution apparatus 100. The computer 1000 includes a CPU 1100, a RAM 1200, a ROM 1300, a HDD 1400, a communication interface (I/F) 1500, an input/output interface (I/F) 1600, and a media interface (I/F) 1700.

The CPU 1100 operates based on a program stored in the ROM 1300 or the HDD 1400 and controls respective units. The ROM 1300 stores a booting program executed by the CPU 1100 during activation of the computer 1000 and a program or the like that depends on the hardware of the computer 1000.

The HDD 1400 stores a program executed by the CPU 1100 and data or the like that is used by the program. The communication interface 1500 receives data from other apparatuses via a communication network 50 (corresponding to the network N illustrated in FIG. 2) to send the data to the CPU 1100 and transmits data generated by the CPU 1100 to other apparatuses via the communication network 50.

The CPU 1100 controls an output apparatus such as a display or a printer and an input apparatus such as a keyboard or a mouse via the input/output interface 1600. The CPU 1100 acquires data from the input apparatus via the input/output interface 1600. Moreover, the CPU 1100 outputs the generated data to an output apparatus via the input/output interface 1600.

The media interface 1700 reads a program or data stored in a recording medium 1800 and provides the same to the CPU 1100 via the RAM 1200. The CPU 1100 loads the program onto the RAM 1200 from the recording medium 1800 via the media interface 1700 and executes the loaded program. The recording medium 1800 is an optical recording medium such as a digital versatile disc (DVD), a phase change rewritable disk (PD), a magneto-optical recording medium such as a magneto-optical disk (MO), a tape medium, a magnetic recording medium, or a semiconductor memory, for example.

For example, when the computer 1000 functions as the distribution apparatus 100 according to the embodiment, the CPU 1100 of the computer 1000 realizes the functions of the control unit 130 by executing the programs loaded onto the RAM 1200. Moreover, the data in the content storage unit 120 is stored in the HDD 1400. Although the CPU 1100 of the computer 1000 reads these programs from the recording medium 1800 and executes the programs, the CPU 1100 may acquire these programs from another apparatus via the communication network 50 as another example.

Moreover, for example, when the computer 1000 functions as the terminal apparatus 10 according to the embodiment, the CPU 1100 of the computer 1000 executes the functions of the control unit 14 by executing the programs loaded onto the RAM 1200.

10. Effects

As described above, the distribution apparatus 100 according to the embodiment includes the receiving unit 131 and the distributing unit 132. The receiving unit 131 receives an acquisition request for a webpage (corresponding to an example of first content). When the acquisition request is received by the receiving unit 131, the distributing unit 132 distributes a webpage displayed with advertising content (corresponding to an example of second content) and control information. The control information causes a region of the advertising content that does not overlap the webpage to be displayed in a clickable state (corresponding to an example of a selectable state) and causes a region of the advertising content overlapping the webpage to be displayed so as to overlap the webpage in a non-clickable state (corresponding to an example of a non-selectable state).

Therefore, the distribution apparatus 100 according to the embodiment can display advertisements beneficial to both a webpage distributor and an advertiser.

In the distribution apparatus 100 according to the embodiment, the distributing unit 132 distributes the control information that causes a region of the webpage overlapping the advertising content to be displayed in a clickable state.

Therefore, since the distribution apparatus 100 according to the embodiment maintains a state where the user can operate the webpage, it is possible to display advertisements beneficial to the webpage distributor.

In the distribution apparatus 100 according to the embodiment, the distributing unit 132 distributes the control information that causes a region of the advertising content overlapping an advertisement display region for displaying advertisements included in the webpage to be displayed in a clickable state.

In the distribution apparatus 100 according to the embodiment, the distributing unit 132 distributes the control information that causes a portion of the advertising content to be displayed so as to overlap the entire advertisement display region.

Therefore, since the distribution apparatus 100 according to the embodiment can cause users to proceed to an advertisement page via the advertising content, it is possible to display advertisements beneficial to the advertiser that provides the advertising content.

In the distribution apparatus 100 according to the embodiment, the distributing unit 132 distributes the control information that causes a region of the advertising content overlapping a region of the output unit 13 (corresponding to an example of a display apparatus) of the terminal apparatus 10 in which the webpage is not displayed to be displayed in a clickable state.

Therefore, the distribution apparatus 100 according to the embodiment can effectively utilize the display region for displaying advertisements. Moreover, since the distribution apparatus 100 can display advertising content so as to give a strong impression to the user, it is possible to improve the advertising effect of the advertising content.

In the distribution apparatus 100 according to the embodiment, the distributing unit 132 distributes the control information that changes a region of the advertising content displayed in the clickable state and a region of the advertising content displayed in the non-clickable state according to a change in a display position of the advertising content in relation to the webpage.

Therefore, since the distribution apparatus 100 according to the embodiment can allow the advertising content to be noticed by the user, it is possible to improve the advertising effect of the advertising content.

In the distribution apparatus 100 according to the embodiment, the distributing unit 132 distributes the control information that causes the advertising content to be displayed at a fixed position without being interlocked with a change in the display position of the webpage.

Therefore, since the distribution apparatus 100 according to the embodiment can display the advertising content so as to give a strong impression to the user, it is possible to improve the advertising effect of the advertising content.

In the distribution apparatus 100 according to the embodiment, the distributing unit 132 distributes control information that determines a display position of the advertising content based on correlation between the display information displayed by the webpage and the advertising content.

Therefore, since the distribution apparatus 100 according to the embodiment can display advertisements so as to be interlocked with the display information of the webpage, it is possible to improve the advertising effect of the advertising content.

In the distribution apparatus 100 according to the embodiment, the distributing unit 132 distributes the control information that causes advertising content of which the display mode dynamically changes with time to be displayed.

In the distribution apparatus 100 according to the embodiment, the distributing unit 132 distributes the control information that causes a plurality of different advertising contents to be sequentially displayed with time.

Therefore, since the distribution apparatus 100 according to the embodiment can allow the advertising content to be noticed by the user, it is possible to improve the advertising effect of the advertising content.

In the distribution apparatus 100 according to the embodiment, the distributing unit 132 distributes the control information for dynamically changing the display mode of the advertising content when a user performs an operation of designating the advertising content.

Therefore, since the distribution apparatus 100 according to the embodiment changes the advertising content only when the user focuses on the advertising content, it is possible to prevent an unsightly advertisement from being displayed to users.

In the distribution apparatus 100 according to the embodiment, the distributing unit 132 distributes the control information that causes the entire advertising content in the final display mode of the advertising content of which the display mode changes dynamically to be displayed in a clickable state.

Therefore, since the distribution apparatus 100 according to the embodiment can allow the user focusing on the advertising content to browse the advertising content, it is possible to improve the advertising effect of the advertising content.

In the distribution apparatus 100 according to the embodiment, when a user performs an operation of designating a region of the advertising content displayed in a non-clickable state, the distributing unit 132 distributes the control information that causes the user to select whether the advertising content is to be selected.

Therefore, the distribution apparatus 100 according to the embodiment can improve the advertising effect of the advertising content and improve usability.

In the distribution apparatus 100 according to the embodiment, the distributing unit 132 distributes the control information for determining whether the webpage and the advertising content are to be displayed so as to overlap based on the type of the webpage.

Therefore, the distribution apparatus 100 according to the embodiment can prevent the webpage and the advertising content from being difficult to see.

In the distribution apparatus 100 according to the embodiment, the distributing unit 132 distributes the control information that causes a region of the advertising content displayed in a non-clickable state to be displayed in a more transparent state than the webpage.

Therefore, since the distribution apparatus 100 according to the embodiment can allow the advertising content to be noticed by the user, it is possible to improve the advertising effect of the advertising content.

The terminal apparatus 10 according to the embodiment includes the receiving unit 16 and the display unit 17. The receiving unit 16 receives the webpage and the advertising content. The display unit 17 displays the webpage and displays a region of the advertising content that does not overlap the webpage in a clickable state and displays a region of the advertising content overlapping the webpage in a non-clickable state together with the webpage.

Therefore, the terminal apparatus 10 according to the embodiment can display advertisements beneficial to both the webpage distributor and the advertiser.

According to an aspect of the embodiment, it is possible to display advertisements beneficial to both the webpage distributor and the advertiser.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A distribution apparatus comprising: a processor programmed to:
   receive an acquisition request, from a terminal apparatus, for a first content to be displayed with a second content; and
   distribute, to the terminal apparatus, the first content and control information that causes the terminal apparatus to:
   (i) display, in a selectable state, both the first content and a first region of the second content, the first region of the second content overlapping an advertisement display region included in the first content; and
   (ii) simultaneously display, in a non-selectable state, a second region of the second content with the first content and the first region of the second content, the second region of the second content overlapping a region of the first content other than the advertisement display region, both the second region of the second content and the region of the first content that is being overlapped are viewable by a user, and a link region of the first content is not disabled such that the first content being overlapped remains selectable when the user selects and clicks on a portion of the first content.

2. The distribution apparatus according to claim 1, wherein the processor distributes the control information that causes a region of the first content overlapping the second content to be displayed in a selectable state.

3. The distribution apparatus according to claim 1, wherein the processor distributes the control information that causes a portion of the second content to be displayed so as to overlap the entire advertisement display region.

4. The distribution apparatus according to claim 1, wherein the processor distributes the control information that causes a region of the second content overlapping a region of a display apparatus in which the first content is not displayed to be displayed in a selectable state.

5. The distribution apparatus according to claim 1, wherein the processor distributes the control information that changes a region of the second content displayed in a selectable state and a region of the second content displayed in a non-selectable state according to a change in a display position of the second content in relation to the first content.

6. The distribution apparatus according to claim 5, wherein the processor distributes the control information that causes the second content to be displayed at a fixed position regardless of a change in the display position of the first content.

7. The distribution apparatus according to claim 1, wherein the processor distributes the control information that determines a display position of the second content based on correlation between display information of the first content and the second content.

8. The distribution apparatus according to claim 1, wherein the processor distributes the control information that causes the second content to be displayed so that the display mode changes dynamically with time.

9. The distribution apparatus according to claim 8, wherein the processor distributes the control information that causes a plurality of different second contents to be sequentially displayed with time.

10. The distribution apparatus according to claim 8, wherein the processor distributes the control information that dynamically changes a display mode of the second content when a user performs an operation of designating the second content.

11. The distribution apparatus according to claim 8, wherein the processor distributes the control information that causes the entire second content displayed in a final display mode of the second content of which the display mode changes dynamically to be displayed in a selectable state.

12. The distribution apparatus according to claim 1, wherein the processor distributes the control information that causes the user to select whether the second content is to be selected when the user performs an operation of designating a region of the second content displayed in a non-selectable state.

13. The distribution apparatus according to claim 1, wherein the processor distributes the control information that determines whether the first content and the second content are to be displayed so as to overlap based on a type of the first content.

14. The distribution apparatus according to claim 1, wherein the processor distributes the control information that causes a region of the second content displayed in a non-selectable state to be displayed in a more transparent state than the first content.

15. The distribution apparatus according to claim 1, wherein the processor displays the second region of the second content as a shadow so as to make the region of the first content that is being overlapped viewable to the user.

16. A terminal apparatus comprising: a processor programmed to:
transmit, from the terminal apparatus, an acquisition request for a first content to be displayed with a second content; and
receive the first content and control information that causes the terminal apparatus to:
(i) display, in a selectable state, both the first content and a first region of the second content, the first region of the second content overlapping an advertisement display region included in the first content; and
(ii) simultaneously display, in a non-selectable state, a second region of the second content with the first content and the first region of the second content, the second region of the second content overlapping a region of the first content other than the advertisement display region, both the second region of the second content and the region of the first content that is being overlapped are viewable by a user, and a link region of the first content is not disabled such that the first content being overlapped remains selectable when the user selects and clicks on a portion of the first content.

17. The terminal apparatus according to claim 16, wherein the processor displays the second region of the second content as a shadow so as to make the region of the first content that is being overlapped viewable to the user.

18. A distribution method executed by a computer, comprising:
receiving an acquisition request, from a terminal apparatus, for a first content to be displayed with a second content; and
distributing, to the terminal apparatus, the first content and control information that causes the terminal apparatus to:
(i) display, in a selectable state, both the first content and a first region of the second content, the first region of the second content overlapping an advertisement display region included in the first content; and
(ii) simultaneously display, in a non-selectable state, a second region of the second content with the first content and the first region of the second content, the second region of the second content overlapping a region of the first content other than the advertisement display region, both the second region of the second content and the region of the first content that is being overlapped are viewable by a user, and a link region of the first content is not disabled such that the first content being overlapped remains selectable when the user selects and clicks on a portion of the first content.

19. A non-transitory computer-readable storage medium with an executable program stored thereon, the program causing a computer to perform:
receiving an acquisition request, from a terminal apparatus, for a first content to be displayed with a second content; and
distributing, to the terminal apparatus, the first content and control information that causes the terminal apparatus to:
(i) display, in a selectable state, both the first content and a first region of the second content, the first region of the second content overlapping an advertisement display region included in the first content; and
(ii) simultaneously display, in a non-selectable state, a second region of the second content with the first content and the first region of the second content, the second region of the second content overlapping a region of the first content other than the advertisement display region, both the second region of the second content and the region of the first content that is being overlapped are viewable by a user, and a link region of the first content is not disabled such that the first content being overlapped remains selectable when the user selects and clicks on a portion of the first content.

* * * * *